US010771618B1

(12) United States Patent
Rosenthal et al.

(10) Patent No.: US 10,771,618 B1
(45) Date of Patent: Sep. 8, 2020

(54) DEVICE MANAGEMENT SYSTEM

(71) Applicants: Saul Rosenthal, Newton, MA (US); Joanne Walker, Newton, MA (US)

(72) Inventors: Saul Rosenthal, Newton, MA (US); Joanne Walker, Newton, MA (US)

(73) Assignee: Digital Media Health, LLC, Newton, MA (US)

( * ) Notice: Subject to any disclaimer, the term of this patent is extended or adjusted under 35 U.S.C. 154(b) by 0 days.

(21) Appl. No.: 16/276,978

(22) Filed: Feb. 15, 2019

Related U.S. Application Data

(63) Continuation of application No. 15/632,866, filed on Jun. 26, 2017, now Pat. No. 10,212,271, which is a continuation of application No. 14/675,324, filed on Mar. 31, 2015, now Pat. No. 9,692,878.

(60) Provisional application No. 61/973,087, filed on Mar. 31, 2014, provisional application No. 62/042,666, filed on Aug. 27, 2014.

(51) Int. Cl.
*H04M 1/725* (2006.01)
*H04W 48/02* (2009.01)
*H04W 4/50* (2018.01)
*H04W 8/18* (2009.01)
*H04L 29/08* (2006.01)
*H04W 48/08* (2009.01)
*H04W 4/12* (2009.01)

(52) U.S. Cl.
CPC ...... *H04M 1/72577* (2013.01); *H04L 67/125* (2013.01); *H04M 1/72566* (2013.01); *H04W 4/50* (2018.02); *H04W 8/183* (2013.01); *H04W 48/02* (2013.01); *H04W 4/12* (2013.01); *H04W 48/08* (2013.01)

(58) Field of Classification Search
CPC ......... H04M 1/72577; H04M 1/72566; H04L 67/125; H04W 8/183; H04W 4/50; H04W 48/02; H04W 4/12; H04W 48/08
See application file for complete search history.

(56) References Cited

U.S. PATENT DOCUMENTS

| 3,426,642 A | 2/1969 | Phipard |
| 4,599,086 A | 7/1986 | Doty |

(Continued)

OTHER PUBLICATIONS (http:en.lapadd.com/products/elephant-charge-box-charging-station-for-all-your-electronic-devices.(as of Jul. 23, 2013).

(Continued)

*Primary Examiner* — Marisol Figueroa
(74) *Attorney, Agent, or Firm* — Finch & Maloney PLLC

(57) ABSTRACT

Systems and methods of device management are disclosed. Aspects relate to systems and methods that may be implemented to control usage of one or more devices. In one embodiment, a device management system includes a memory, an interface, at least one processor coupled to the memory and the interface, and a control component executable by the at least one processor and configured to determine, at a predetermined time, whether a connection exists between a managed device and the device management system via the interface, generate, in response to determining that the connection did not exist at the predetermined time, a notification indicating that the connection does not exist, and transmit, in response to determining that the connection did not exist at the predetermined time, a request to the managed device to restrict at least one function of the managed device.

17 Claims, 14 Drawing Sheets

(56) References Cited

U.S. PATENT DOCUMENTS

| | | | |
|---|---|---|---|
| 4,977,764 | A | 12/1990 | Runnalls |
| 5,142,445 | A | 8/1992 | Sorensen et al. |
| 5,805,075 | A | 9/1998 | Carlson et al. |
| 6,066,175 | A | 5/2000 | Henderson et al. |
| 7,795,837 | B1 | 9/2010 | Haun et al. |
| 8,185,101 | B1 | 5/2012 | Wiseman et al. |
| 8,320,110 | B2 | 11/2012 | Chen |
| 8,719,909 | B2 | 5/2014 | Fitzgerald et al. |
| 8,880,054 | B2 | 11/2014 | Wesby |
| 8,893,007 | B2 | 11/2014 | Vadde et al. |
| 9,130,385 | B2 | 9/2015 | Chen |
| 2003/0135275 | A1 | 7/2003 | Garcia et al. |
| 2004/0092248 | A1 | 5/2004 | Kelkar et al. |
| 2005/0049590 | A1 | 3/2005 | Alleyne et al. |
| 2005/0077997 | A1* | 4/2005 | Landram ............ H04L 29/06 340/5.54 |
| 2006/0074488 | A1 | 4/2006 | Abdou |
| 2006/0241621 | A1 | 10/2006 | Moskowitz et al. |
| 2007/0162028 | A1 | 7/2007 | Jackson et al. |
| 2007/0188303 | A1* | 8/2007 | Faro ............ G07C 9/00103 340/5.73 |
| 2008/0161927 | A1 | 7/2008 | Savage et al. |
| 2008/0188940 | A1 | 8/2008 | Cohen et al. |
| 2012/0237908 | A1* | 9/2012 | Fitzgerald ............ G06F 21/88 434/236 |
| 2012/0311673 | A1 | 12/2012 | Sodah |
| 2013/0026972 | A1 | 1/2013 | Luke et al. |
| 2013/0278411 | A1 | 10/2013 | DiBella et al. |
| 2016/0055465 | A1* | 2/2016 | Rausch ............ G06Q 30/0601 705/39 |
| 2017/0345248 | A1* | 11/2017 | Peters ............ G07F 17/00 |

OTHER PUBLICATIONS

<http:www.anthro.com/getmedia/127dd1f3-1592-49d2-973c-4103063403fe/Anthro spec-Guide 31-35 Charging Solutions Jun. 2013>(as of Jun. 2013).

<http:www.anthro.com/getmedia/19d29cf0-fbca-4395-b67d-1d321da21d6b/300-5549-00?ext=.pdf>(as of Feb. 17, 2013.

<http:www.anthro.com/products/tablet-cabinet#.UoZaKqgo6Uk>(as of Nov. 16, 2013).

<http://www.ecofriend.com/solar-mobile-charging-kiosks-aim-to-make-cellphones-greener.htm>(as of Jun. 24, 2010).

<http://www.geeky-gadgets.com/useful-gadgets-the-portable-electronics-charging-station/> (as of Jun. 10, 2008).

<http://www.globalindustrial.com/c/office/computer-furniture/laptop-storage-charging>(as of Nov. 17, 2013).

<http://www.houzz.com/photos/1915239/Original-Home-Office-3-Drawer-Cabinet-with-Charger-traditional-cable-management>(as of Jul. 12, 2014).

<http://www.houzz.com/photos/5657466/Bamboo-Electronics-Charging-Station-contemporary-desk-accessories->(as of Dec. 1, 2013).

<http://www.pc-security.com/products_solutions/iPod/DS-IPT-4.htm>(as of Jun. 21, 2013).

\* cited by examiner

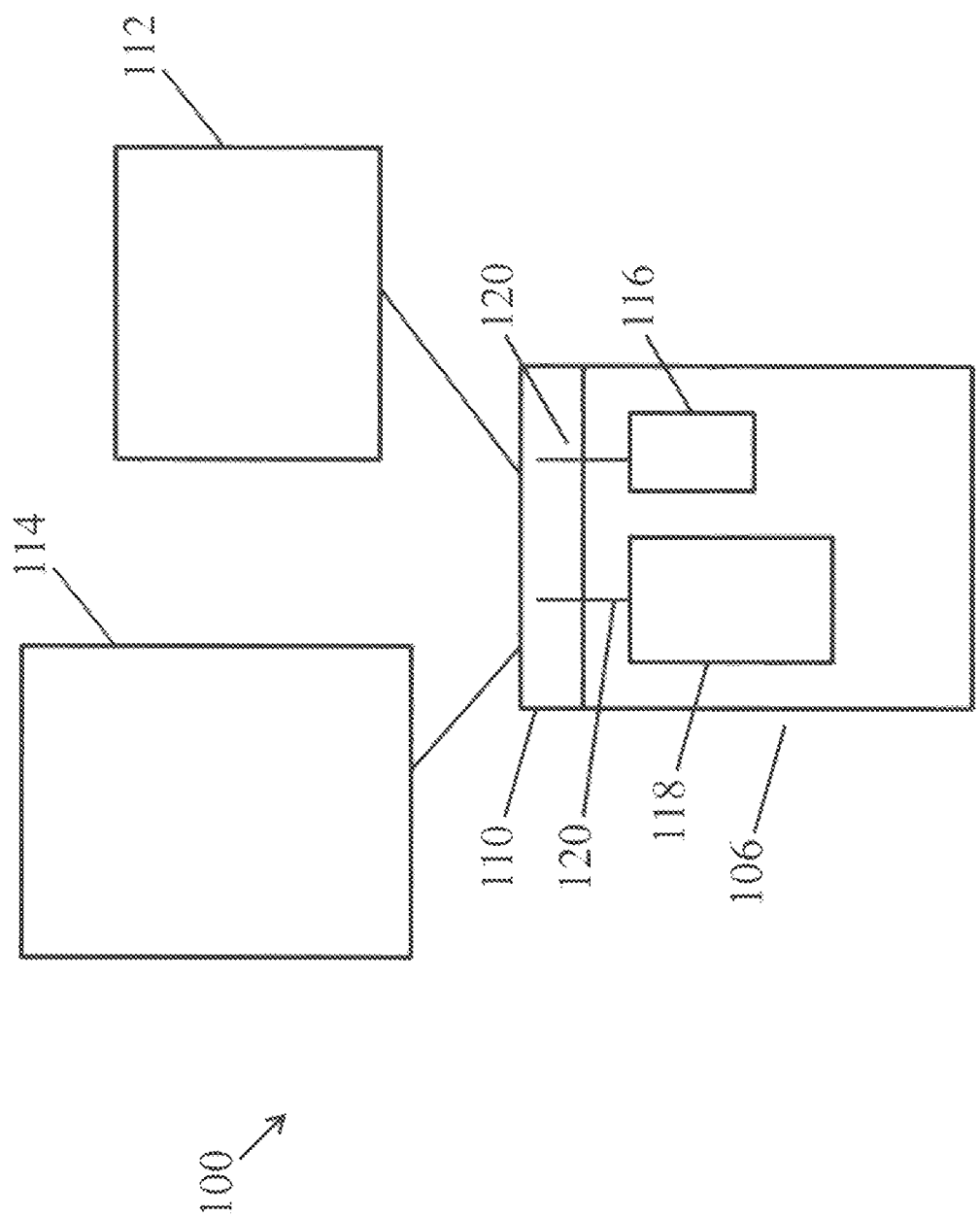

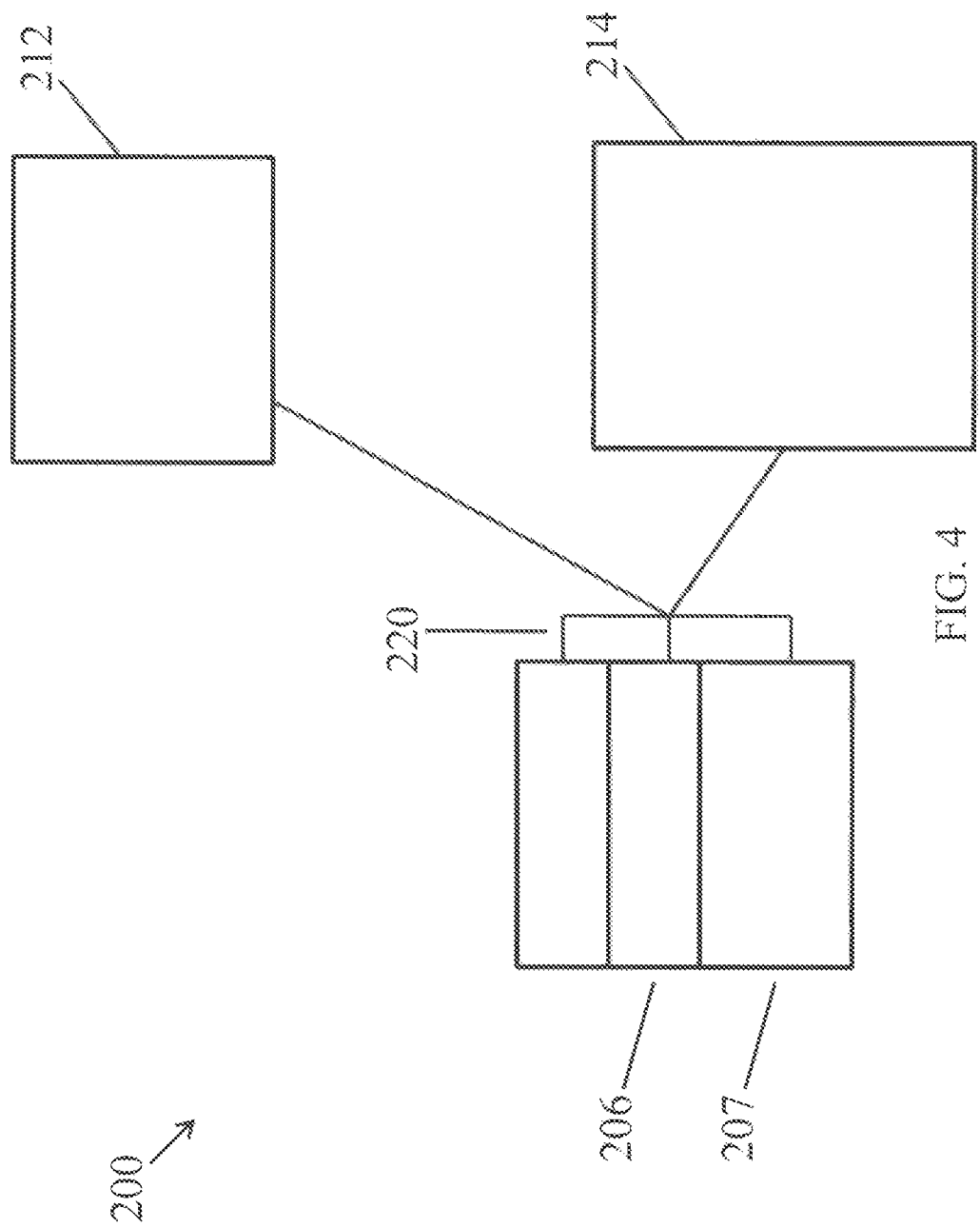

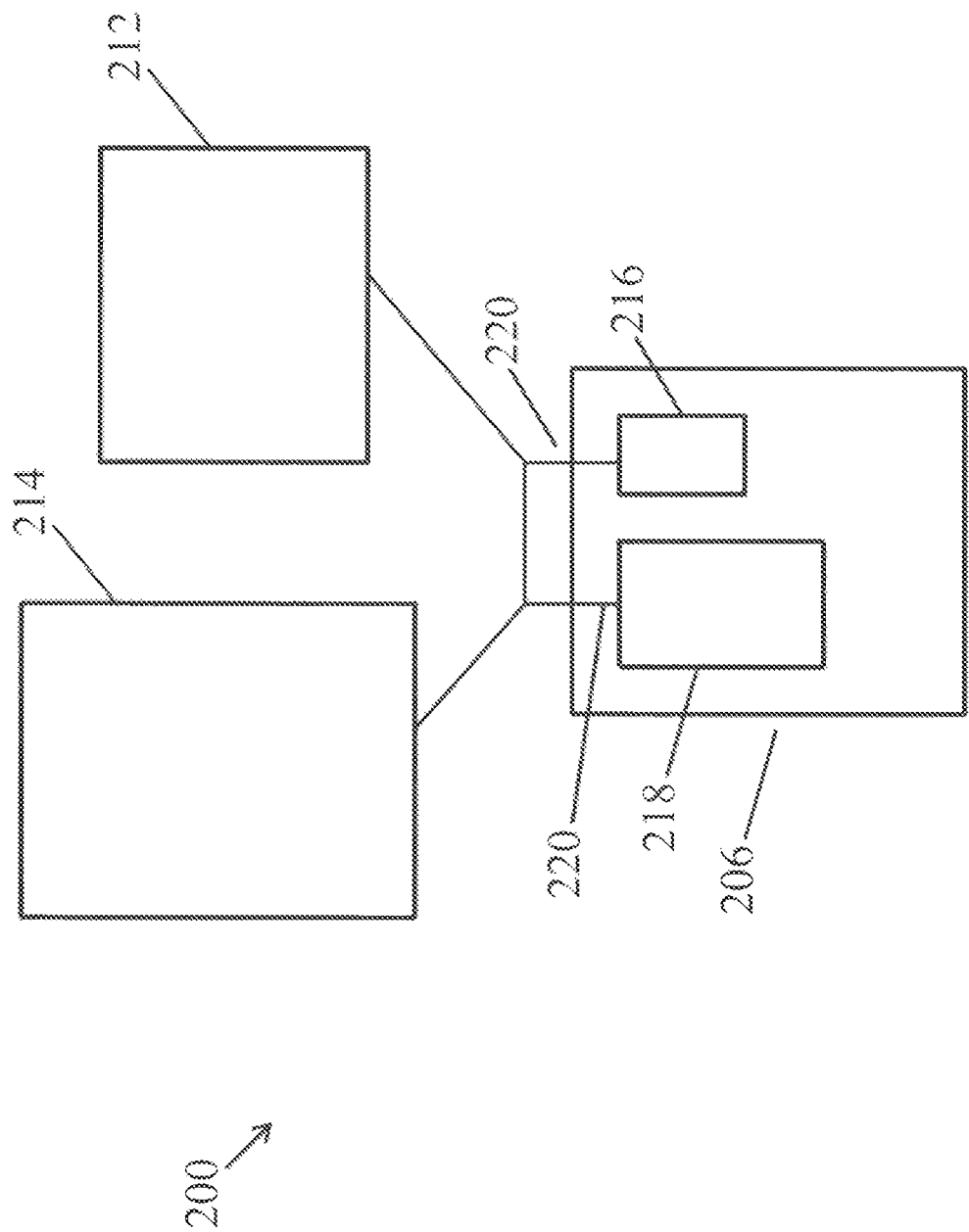

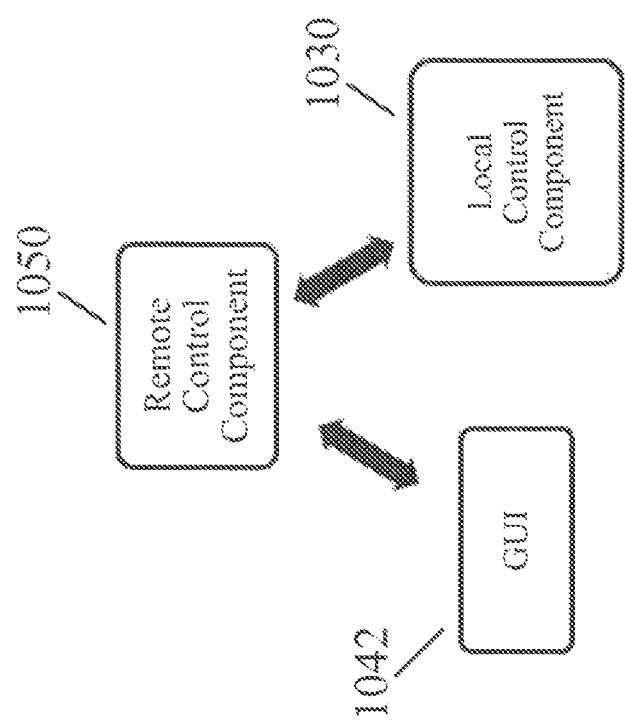

Administrative Application Use and Features

Agent Application Use and Features

DEVICE MANAGEMENT SYSTEM

RELATED APPLICATIONS

This application claims the benefit under 35 U.S.C. § 120 as a continuation of U.S. patent application Ser. No. 15/632,866, titled "DEVICE MANAGEMENT SYSTEM," filed on Jun. 26, 2017. U.S. patent application Ser. No. 15/632,866 claims benefit under 35 U.S.C. § 120 as a continuation of U.S. patent application Ser. No. 14/675,324, titled "DEVICE MANAGEMENT SYSTEM," filed on Mar. 31, 2015. U.S. patent application Ser. No. 14/675,324 claims priority under 35 U.S.C. § 119(e) to U.S. Provisional Application No. 61/973,087, titled "PORTABLE DEVICE STORAGE UNIT," filed Mar. 31, 2014, and U.S. Provisional Application No. 62/042,666, titled "DEVICE STORAGE SYSTEM," filed Aug. 27, 2014, each of which is hereby incorporated herein by reference in its entirety.

BACKGROUND

Technical Field

The technical field relates generally to device management systems and, more specifically, to systems and methods of securing and controlling access to and usage of devices.

Background

Fueled by continued advances in information technology and the growth of the Internet, the average person's personal and professional use of personal electronic devices has increased dramatically in recent times. While much of this use is positive and productive, for some (especially the young) the amount of personal electronic device use can become excessive and problematic. Examples of such excessive and problematic behavior range from simple time mismanagement to severely addictive behavior.

The software industry has authored programs directed toward monitoring and recording computer use. Such systems are often used by employers to control and understand how and where their employees spend their time. Similarly, programs exist that enable a person in authority to prohibit access to specified internet sites and computer applications or to allow access only to specified Internet sites and computer applications. These programs are often used by parents or educational personnel to ensure that children have access only to appropriate content.

SUMMARY

Aspects and embodiments are directed to a device management system. The device management system may include a storage component and a control component. The storage component may include a housing configured to store at least one managed device and to provide at least one of power and networking capability to the at least one managed device. The control component may be in communication with the storage component and may be configured to control access to the storage component.

At least one aspect of the invention is directed to a device management system. The device management system may comprise a memory, an interface, at least one processor coupled to the memory and the interface, and a control component executable by the at least one processor and configured to: determine, at a predetermined time, whether a connection exists between a managed device and the device management system via the interface, generate, in response to determining that the connection did not exist at the predetermined time, a notification indicating that the connection does not exist, and transmit, in response to determining that the connection did not exist at the predetermined time, a request to the managed device to restrict at least one function of the managed device.

According to one embodiment, the control component is configured to serve an Internet-based user interface. According to a further embodiment, the Internet-based user interface is browser-based. According to one embodiment, the control component is configured to communicate with an agent application executed by the managed device.

According to some embodiments, the managed device is a wireless communication device. According to another embodiment, the managed device includes a telephone and the request includes a request to limit the telephone to voice calls only.

According to one embodiment, the interface includes at least one of a power interface and a data interface. According to another embodiment, the interface includes a wireless interface. According to another embodiment, the interface includes a universal serial bus interface.

According to another embodiment, the notification includes at least one of an email, a text message, emission of visible light, emission of audio output, and emission of vibratory output.

According to further comprising a housing including the memory, the control component, and a light emitting diode (LED), wherein the LED is configured to emit the visible light.

According to one embodiment, the device management system further comprises a housing including the memory, the interface, the control component, and a storage component configured to store the managed device. According to a further embodiment, the storage component is configured to provide the managed device with access to the interface. According to one embodiment, the storage component comprises at least one sub-component that is configured to be modular. According to another embodiment, the storage component further comprises a locking mechanism that is configured to control the access to the managed device. According to a further embodiment, the locking mechanism is controlled by the control component.

According to another embodiment, the device management system further comprises a data storage component in data communication with the at least one processor, wherein the control component is further configured to: receive usage rules for the managed device, wherein the usage rules comprise at least one usage requirement, receive usage data from the managed device via the interface, store at least a portion of the usage data in the data storage component, determine whether the usage data complies with the usage rules by comparing the usage data with the usage rules, and generate a notification indicating non-compliance with the usage rules in response to determining that the usage data does not comply with the usage rules.

According to one embodiment, the usage rules specify a plurality of associations between a plurality of storage compartments and a plurality of managed devices and the usage data indicates whether the plurality of managed devices were stored in the plurality of storage components according to the plurality of associations. According to another embodiment, the control component is further configured to transmit, in response to determining the non-compliance, a request to the managed device to restrict at least one function of the managed device. According to some embodiments, the control component is further configured to receive, from a host, a request to restore the at least one function. According to certain embodiments, the usage rules are specific to at least one function of the managed device. According to another embodiment, the usage data includes at least one of a picture, a movie, a charge level of a battery of the managed device, an SMS text message, an email message, a voicemail message, web browsing history, and phone call history. According to a further embodiment, the at least one usage requirement includes a pre-determined schedule.

According to one embodiment, the device management system further comprises a host configured to receive the notification. According to a further embodiment, the host is further configured to receive the usage data. According to another embodiment, the host is configured to transmit one or more configurable parameters that control operation of the control component to the control component, the one or more configurable parameter including the usage rules.

According to at least one embodiment, the portion of the usage data includes types of data specified by a user profile associated with the managed device. According to some embodiments, the user profile further specifies usage rules for the managed device.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 3 is a top view of a sub-component of the example storage component of FIG. 2;

FIG. 4 is a side elevational view of another example storage component of a device management system in accordance with one or more aspects of the disclosure;

FIG. 5 is a top view of a sub-component of the example storage component of FIG. 4;

FIG. 6B is a context diagram showing relationships between a local control component, a remote control component, and a graphical user interface (GUI) of a device management system in accordance with one or more additional aspects of the disclosure;

DETAILED DESCRIPTION

Figure 1:
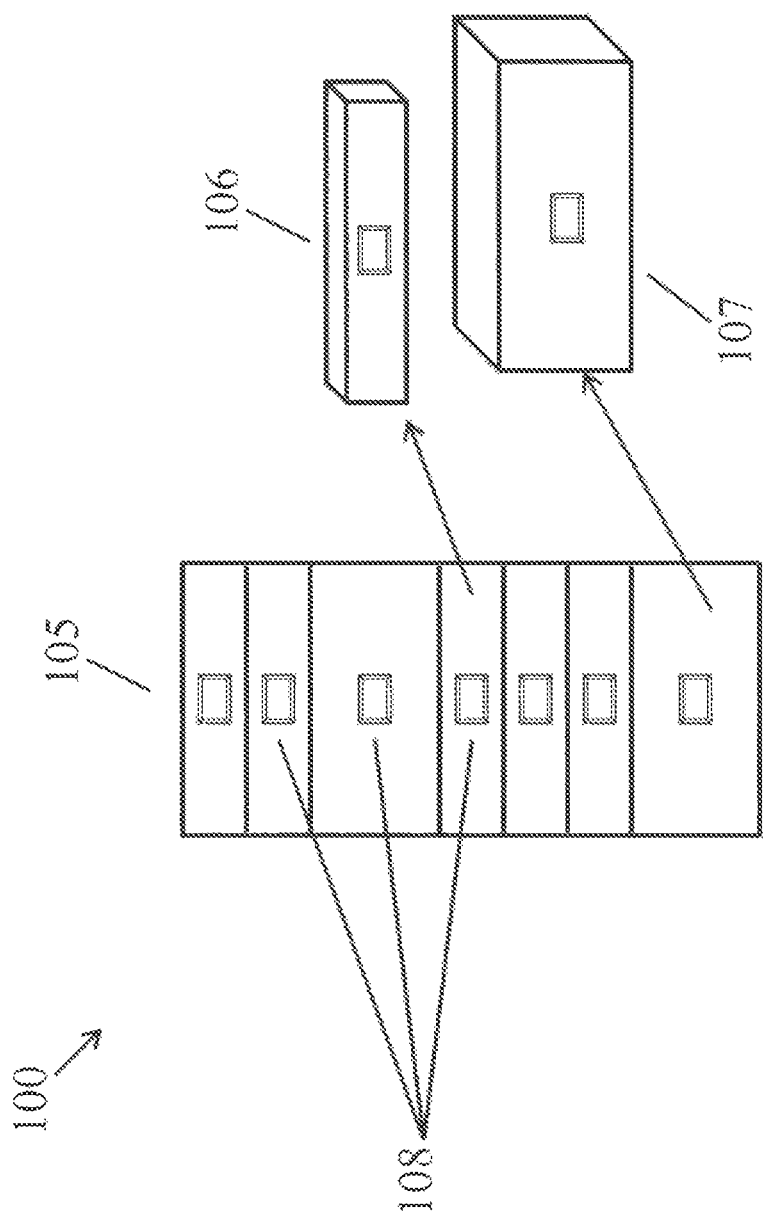
FIG. 1 is a front elevational view of an example storage component of a device management system in accordance with one or more aspects of the disclosure.

By way of introduction, aspects of this disclosure relate to systems and methods for managing secure storage and access to or one or more managed devices. According to some aspects, the systems and methods may be configured to monitor one or more managed devices associated with a device management system. The systems disclosed herein may provide a user with the ability to monitor information associated with a managed device, such as data stored on or accessed by the managed device, settings, type of usage, etc. This information may be provided by the managed device itself and/or may be provided by one or more external sources, as described further below. According to at least one embodiment, the information may be used to form a usage plan for a user of a managed device associated with the device management system. In certain instances, the usage plan may be used to modify one or more aspects of the functional use of the managed device by the user.

According to some aspects, the one or more managed devices housed or managed by the device management system may be portable electronic devices. As used herein, the terms "mobile device," "portable device," and "portable electronic device" may be used interchangeably and are intended to broadly cover many different types of electronic devices that are portable. For example, non-limiting examples of portable electronic devices: wireless communication devices such as cellular and mobile telephones and smart phones, laptop computers, notebook computers, personal computers, Personal Digital Assistants (PDAs), tablet computers, gaming units, electronic readers, and any other handheld or worn electronic device that can be carried on one's person, including cameras, such as digital cameras, video recorders, etc. Other non-limiting examples of portable devices and related accessories include USB flash drives and dongles, connection cables, adapters, MP3 players, portable global positioning system (GPS) units, and portable satellite receivers. It is appreciated that new portable devices continue to be developed and marketed to consumers who use them for a variety of purposes. Such new portable devices are intended to be included in the broad definition of a portable electronic device for purposes of the methods and system disclosed herein.

According to a further aspect, the one or more managed devices stored and managed by the device management system may include other types of personal devices or objects that may not necessarily be categorized as portable electronic devices. For example, the device management system may store and manage access to objects such as jewelry, keys, watches, glasses, wallets, firearms, musical instruments, medications, or any other object where it is desired to manage and control access. According to certain aspects, these types of devices may be equipped with an identifier, such as a bar code or tag, such as a radio tag (e.g., RFID chip), that can be attached to or embedded into the object and that may be configured to convey identity, location and/or status information. For instance, when activated, these tags may be capable of transmitting data to a data reader, or the reader may be capable of gathering the data from the tag. For example, determining and reporting location information using a radio transmitter, or transmitter and transceiver that is also configured to process and transmit the information over networks, such as terrestrial or satellite networks, using a web-based interface and application is disclosed in U.S. Pat. No. 8,130,096, which is hereby incorporated herein by reference in its entirety. The device management system may therefore be capable of using the tag to track information regarding the devices, such as logging when the device enters and exits a physical space defined by a housing of the device management system. According to a further aspect, a bar code reader may be integrated as part of the device management system. Managed devices may be equipped with a bar code and when scanned by the reader, the bar code may function as a "password" for the managed device to gain access to a housing of the device management system. In addition, password input may also be input by other identification methods, such as through the aforementioned RFID tags, identification badges, etc. As used herein, the items stored or otherwise tracked by the device management system may be referred to as "managed devices," and references to "managed devices" include personal electronic devices as well as the other types of devices and objects discussed above.

According to at least one aspect, the device management system may be identified using any one or more of the methods described above in reference to the managed devices. This capability allows the device management system to be identified by one or more of the managed devices associated with the device management system, another system, such as the Internet of Things or a smart home system, as well as other device management systems. For example, a bar code may be attached or otherwise associated with the device management system, which may be used by a managed device, another system, or another device management system to identify the device management system.

The aspects, embodiments, and examples disclosed herein are not limited in their application to the details of construction and the arrangement of components set forth in the following description or illustrated in the accompanying drawings. These aspects, embodiments, and examples are capable of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope of the embodiments disclosed herein.

In accordance with one or more embodiments, a device management system is provided. The device management system may include at least one storage component and at least one control component. As used herein, the term "storage component" means a component capable of holding one or more physical items for future use. A "control component," as discussed further below, refers generally to a component configured to manage one or more of storing, charging, backing up, securing, monitoring, or other functions of the device management system. These named features are non-limiting examples of potential components that are included in the device management system and are not meant to exhaust the possible functions of other components.

Storage Component Overview

According to at least one embodiment, the device management system includes a storage component. Each storage component may be configured to contain one or more managed devices and/or objects, such as the portable electronic devices and other objects discussed above. Compartments or other sub-components of the storage component can be combined in a modular fashion, and the unit may be reconfigured as the needs of one or more users change and/or the needs of the environment in which the system is used change, for example, by adding or removing one or more sub-components of the storage component, or by adding new sub-components to the storage component as they are developed. Thus, the storage component is adaptable to different requirements of one or more users.

The term "modular" as used herein describes the functionality of the storage component and its sub-components or modules. For example, subcomponents of the storage component may be configured with standardized or independent dimensions that can be used to construct a larger structure. The modules may be configured to provide for easy (and in some cases, tool-less) assembly in a flexible arrangement dependent upon a user's particular needs. For example, a cabinet, closet, or other housing configuration may be constructed from one or more individual drawers, trays, cubbies, shelves, bins, dividers, hooks, and the like.

The storage component may be positioned at a location accessible to various users. The location may take any of a large variety of forms, for example, as a stand-alone unit in a residence or commercial establishment, or it may be incorporated into an already-existing structure or device. For example, the storage component may take the form of a cabinet that is positioned in a kitchen or bedroom of a residence. Existing structures may also be retro-fitted to accommodate the storage component. Storage components may open mechanically or electronically once a locking mechanism is appropriately disengaged, as discussed further below.

Each component may be removed or reconfigured depending on the storage needs of the user. A user may purchase a new managed device, such as a tablet, and may therefore add a new compartment, such as a drawer, to an existing structure. The modular configuration allows for the user to easily replace and reconfigure the storage component into various structural arrangements. For example, the storage component may take the form of a compartment, such as a case, cabinet, drawer, or locker. In some embodiments, the storage component may be a room or a portion of a room. In another embodiment, the storage component may be a closet or a portion of a closet. The storage component may be configured to contain one or more managed devices or accessories, by for example, including inserts designed to fit specific phones, computers, gaming controls, dongles, etc.

In at least one embodiment, the device storage system can be finished in multiple materials and colors, to match the user's wishes. For example, a system designed to be built or placed in a user's kitchen might have a finish that will match the existing kitchen. Another user might prefer a desk unit that is finished in a material that matches an existing desk.

According to at least one embodiment, the storage component may be configured to be mobile and may therefore be capable of moving to a new location. For example, the storage component may be removed from its current location and positioned to a new location, which may be the same general location, such as to another room within the same residence, or a new location, such as a new residence. The storage component may have wheels or other mechanical features that allow the unit to be moved, or the unit may simply be disassembled and reassembled at the new location. Further, one or more sub-components of the storage component may be configured to be mobile. For example, one or more sub-components can be removed from the larger unit and taken to a different location. Thus, the sub-components may be used during periods when one or more users are traveling or otherwise using the unit in an alternative location. According to some embodiments, the storage component is configured to be secured to a wall or floor of an existing structure to prevent theft of the unit.

Referring to FIG. 1, a front elevational view of one example of a modular storage component 100 is shown. The storage component 100 may take the form of a cabinet 105 and may include one or more modular components, such as trays 106 and drawers 107. Multiple trays 106 and drawers 107 may be positioned inside the storage component. The trays 106 or drawers 107 may be stacked on top of or beside one another and may be sized to any dimension. The trays 106 and drawers 107 may be pulled out on rails, and may also include knobs on the front to allow easy access to the interior of a compartment. In addition, the trays 106 and drawers 107 may be equipped with a locking mechanism 108, such as a physical or electronic lock. For example, an electronic lock may be configured by an administrative user to allow access to the tray 106 or drawer 107. For instance, a drawer 107 may be assigned or otherwise dedicated to one or more children in a family, and access to the drawer may be configured by the administrator, such as a parent. The child may be required to return one or more managed devices by a predetermined time and/or the child may not be allowed to access the managed device(s) before a predetermined time. Thus, the door may be configured to be unlocked or locked depending on the configuration set by an administrative user. Further, the drawer 107 or other component may include an exterior display or other entry mechanism, such as a bar code reader or a biometric lock, for the user to enter a password or other otherwise gain access to a compartment, such as a drawer.

Figure 2:
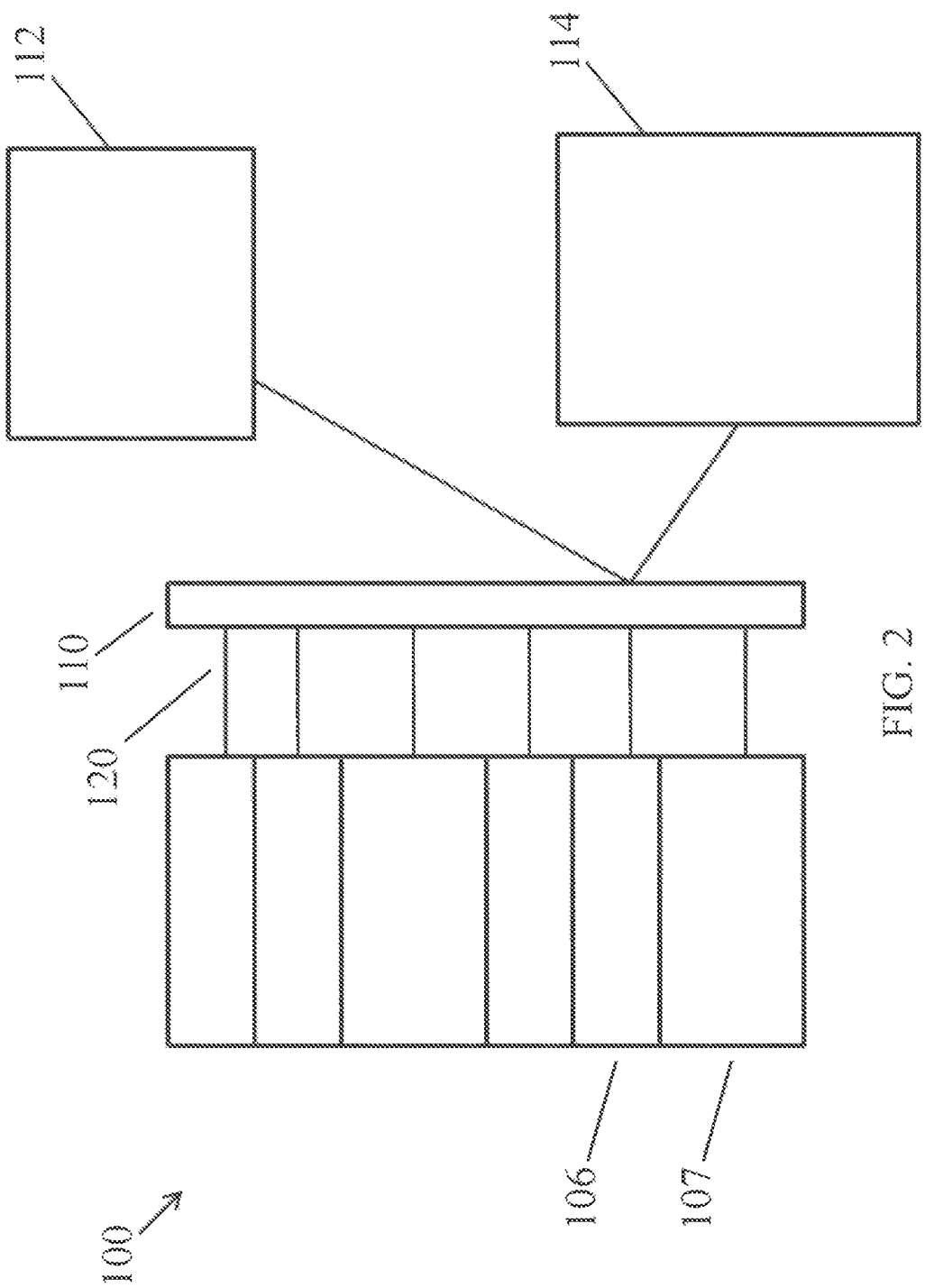
FIG. 2 is a side elevational view of another example storage component of a device management system in accordance with one or more aspects of the disclosure.

FIG. 2 shows a side elevational view of an example modular storage component 100. According to certain embodiments, the rear of the storage component 100 may include or otherwise be connected to a backplane 110 that is configured to attach or otherwise be connected to the storage component 100. The backplane 110 may be configured to distribute power from the power supply 112 to one or more of the modular components, such as tray 106 or drawer 107, and/or managed devices within one or more of the modular components. The backplane 110 may further be configured to provide a network connection via networking device 114 to one or more of the modular components, such as tray 106 or drawer 107, and/or managed devices within one or more of the modular components.

In one embodiment, the backplane 110 is implemented within the cabinet 105. In this embodiment, the walls of each tray 106 and/or drawer 107 include communication and power buses that are interconnected when the trays 106 and drawers 107 are appropriately connected (e.g., stacked on top of each other). In this embodiment, the power supply 112 and/or the networking device 114 may be included within at least one of the trays 106 and/or the drawers 107. For example, the modular components may include a first tray type that includes power interconnections running vertically through the walls of the tray and a second tray type that includes both the power interconnections and a power supply 112. In this example, a cabinet configuration may be constructed that includes a plurality of trays of the first type having the appropriate interconnections and only a single tray (or a plurality of trays) of the second type having the power supply 112. Accordingly, power can be distributed from the single tray (or the plurality of trays) of the second type to the plurality of other trays in the cabinet configuration. A similar tray construction may be implemented for the networking device 114. For example, the modular components may include a first tray type that includes communication interconnections running vertically through the walls of the tray and a second tray type that includes both the communication interconnections and a networking device 114. In this example, a cabinet configuration may be constructed that includes a plurality of trays of the first type having the appropriate interconnections and only a single tray (or a plurality of trays) of the second type having the networking device 114.

In some embodiments, one or more connectors 120 (e.g., cables or other form of attachment, as discussed further below) may provide a link between the backplane 110 and the interior of the storage component. The backplane 110 may be configured to provide the power and/or networking capability to one or more of the modular components, such as a tray 106 or drawer 107 through the use of the cables. For example, the backplane 110 may include one or more vertical and/or horizontal power buses or power bus bars. One end of a cable, such as a device-specific adapter, may be configured to connect to the power bus and the other end may be configured to connect to one or more managed devices or to a USB socket in tray 106 or drawer 107 which can connect via a standard USB cable to one or more managed devices. For instance, each modular component of the storage component may be configured to connect to a power bus through the cable. In turn, the backplane 110 may also be configured to connect to the power supply 112. For example, the power buses of the backplane 110 may be connected to the power supply 112 so that the managed devices stored within the storage component 100 may be charged.

The backplane 110 may also be configured to provide networking capability, and through the networking capability provide access to: the Internet, connectivity to other devices stored within the storage component 100, and/or connectivity with a computer system included as part of the device management system. For example, the backplane 110 may be configured with a network adapter, such as a network adapter configured to connect to a Universal Serial Bus (USB) port. The backplane 110 may be configured to connect to or otherwise be in communication with a networking device 114 that provides the networking capability to the backplane 110 which is in turn connected to one or more of the stored and managed devices. As will be appreciated, a single cable and/or adapter may provide both power and networking capability.

In some embodiments, the backplane 110 includes a USB buses to facilitate power distribution and communication between various components. USB buses include two or more power connections (e.g., a 5 Volt DC line and a Ground line) in addition to two or more communication connections (e.g., a set of differential pair lines). In these embodiments, the power supply 112 may generate the power for the power connections and the networking device 114 may employ the communication connections to communication with the trays 106, drawers 107, or any managed device within the storage component 100. It is appreciated that the backplane 110 may also include a second bus to facilitate the distribution of power at a different voltage level and/or a different power type. For example, the backplane 110 may have a second power bus designed to distribute AC power at 120 Volts and a 60 Hz frequency to the trays 106, drawers 107, or any device within the storage component 100.

According to another embodiment, the networking device 114 is in communication with the managed devices stored within the storage component 100 using wireless methods. As such, neither the backplane 110 nor cables may be used for providing networking capability to the system. The wireless methods may include, for example, a BLUETOOTH wireless connection. According to some embodiments, the networking device 114 may be positioned within the storage component 100. For example, the networking device 114 may form or be otherwise integrated into a "base" in the bottom of the unit upon which other modular components, such as drawers or trays, can be stacked. According to another example, the networking device 114 may be built to the side of the modular components, such as drawers, or may be positioned above the modular components. According to another alternative, the networking device 114 may be positioned external to the storage component 100, such as in another part of the room where the storage component resides, or in another room of the building.

FIG. 3 shows a top view of a drawer 106 of the modular storage component 100 featured in FIG. 2. One or more managed devices, such as portable electronic devices 116 and 118 are stored within the interior of the drawer 106. For example, the drawer 106 may store a mobile phone 116 and an electronic notebook 118. The backplane 110 is connected to or otherwise in communication with the back of the drawer 106 and is also in communication with the power supply 112 and networking device 114 discussed above. Also shown in FIG. 3 are connectors 120, such as USB cables, that provide at least one of power and networking capability (data) to each of the portable electronic devices 116 and 118. For example, different types and sizes of modular components may be assembled into the same unit. Also, modular components are not limited to a particular size or function. For instance, one or more of the modular components may not include a network connection, a power charging connection, and/or a locking mechanism. It is appreciated that the drawer 106 may communicate with and/or provide power to the managed devices within the drawer 106 (e.g., the mobile phone 106 and the electronic notebook 118) wirelessly in place of or in conjunction with the connectors 120. For example, the device management system may include a wireless charging system for battery operated devices (e.g., mobile phones, laptops, etc.) is described in U.S. Patent Application Publication No. 2014/0091636, which is hereby incorporated herein by reference.

FIG. 4 shows a side elevational view of another example modular storage component 200. The storage component 200 is similar to the structure shown in FIG. 2, but excludes the backplane 110. Instead, the modular components, such as drawers 206 and 207, are in a stacked configuration and the connectors 220 provide connection to the power supply 212 and/or the networking device 214. The networking device 214 may also be in communication with the stored devices through a wireless network, and therefore networking capability through the connectors 220 may not be necessary but may provide fault tolerance. FIG. 5 shows a top view of a drawer 206 of the storage component 200 featured in FIG. 4 and is similar to the example shown in FIG. 3, but excludes the backplane 210.

According to some embodiments, one or more of the modular components of the storage component are each configured with power and/or networking capability. For example, signals (i.e., power or networking) may propagate through buses that are built into each modular component, which may also allow the individual modular components to be electrically connected to each other.

The example modular storage components shown in FIGS. 1-5 are for purposes of explanation and illustration only and are used to explain several configurations in which the system may be constructed. However, it is to be appreciated that embodiments disclosed herein are not limited to the specific examples shown in FIGS. 1-5, and these examples are not intended as a definition of the scope of the embodiments disclosed herein.

According to some embodiments, the modular component may include a customized feature that is configured to accommodate a specific type or make/model of a stored managed device. For instance, a "cradle" may be molded and configured to hold a particular model of a mobile phone and to provide power and/or networking capability to the mobile phone.

In accordance with some embodiments, the storage component is configured to provide power at one or more voltages to the stored devices. For example, a laptop computer may require 12 volts to recharge, while a mobile phone may only require 5 volts. Thus, a modular storage component may be configured to accommodate one or both of these devices by providing hardware that the devices may "plug" into for the purposes of recharging. The modular storage component may receive the appropriate voltages from, for example, power supply 112 or convert a voltage received from the power supply 112 to the appropriate voltage level. For example, the modular storage component may receive AC power at 120 Volts at 60 Hz from the power supply 112 and convert the AC power via, for example, a rectifier circuit to DC power at 12 Volts for an electronic device. Alternatively, the modular component may receive DC power at 5 Volts from the power supply 112 and convert the DC power via, for example, a buck-boost converter from the 5 Volt voltage level to a 12 Volt voltage level for an electronic device. In at least some embodiments, the power conversion circuitry described above is integral to a cradle and tailored to provide power with characteristics suitable for the specific type of managed device for which the cradle is molded.

In certain embodiments, the modular storage component may include one or more components of the control component. For example, an access panel may provide an interface with the control component, as discussed below, thereby allowing a user to unlock or otherwise configure or modify different functions of the device management system.

In accordance with some embodiments, the storage component may be configured to provide power to one or more devices without the use of cord, adapter, or other connector that is integrated into a compartment and connects to the power supply through hardware, such as the aforementioned backplane and cables. As future technologies develop, the compartment may be outfitted with an apparatus or feature that provides power to the device. For instance, an inductive power transfer system based on magnetically induced sources of power may be installed in a compartment of the storage component and may thus provide charging power to managed devices.

According to at least one embodiment, the modular storage component includes one or more informational displays, such as green LED lights for a managed device that is stored and charging, etc. The informational display may indicate the status of one or more managed devices that are associated with the storage component. For example, a general status of each of the managed devices can be displayed on the informational display, where an indicator such as a green light may indicate that the managed device is where it should be (i.e., the managed device resides in a first identified space associated with the managed device, e.g. the managed device is stored in a unit of the modular storage component or out being used). Further, a specific status, where an indicator such as a red light or a red phone icon, may indicate the opposite, that the managed device is not where it should be (i.e., the managed device resides in a second identified space), including instances where the managed device has not been placed into the unit by a designated time, etc. In addition, an alarm may sound if a managed device or an accessory or other component (such as a USB or power adapter) is removed from the unit. A user may be able to use the informational display to quickly identify the status of each managed device associated with the storage component to determine whether each managed device has been stored correctly or not. The informational display may be located on an exterior of the modular storage component and/or may be located on a subcomponent, such as on the exterior of a drawer positioned within the modular storage component.

In accordance with some embodiments, the informational displays may be configured to interact with the user (e.g., an administrative user). In such instances, the informational display may include a touchscreen, keyboard, or keypad that is positioned on the exterior of the storage component that allows the user to enter information, such as passwords, or provide information regarding one or more managed devices. According to some embodiments, the informational display may also be configured to accept information from the user, such as passwords, in other forms, such as through the use of fingerprints or other biometric identification methods, ID cards, RFID tags, barcodes, etc. In some embodiments, the informational displays may be a component of an overall user interface, such as the user interface 1008 described below with reference to FIG. 10.

According to at least one aspect, managed devices stored within the storage component may be silenced or otherwise made "quiet" while they are stored within the unit. This capability may be provided by the control component, as discussed further below. For instance, software or another method of interfacing with the managed device may be configured to modify and/or override the sound settings on a managed device during the period of the time it is stored within the unit.

According to some embodiments, at least one compartment or element of the modular storage component may house or otherwise accommodate the control component. For example, the control component may include a computer system (e.g., the computer system 300 described below with reference to FIG. 11), a locking mechanism (e.g., keypad or touchscreen) or other elements housed in one or more compartments or otherwise located within the storage component and that may serve as a base to the storage component. Supports from or along the sides of the control component may serve to house one or more separate compatible storage components and to provide power and communication between the storage and control components. Storage components of one or more sizes and shapes may be assembled together with the control component. According to another example, the storage component may be divided into two modules. For example, the first module may house the computer system or control component to serve as the base of the unit, and the second module may house the locking mechanism and other components and serve as the cap for the unit.

Control Component Overview

According to at least one embodiment, the device management system includes a control component. The control component may be configured to implement a number of features of the device management system. One or more of these features may be provided through the use a computer system, as discussed further below, that includes at least one of a processor, memory, interconnection element, interface, and a data storage element. For example, the networking capability discussed above in reference to the storage component may be provided by a computer system of the control component. According to some aspects, the control component includes a local control component and a remote control component, as discussed further below.

In at least one embodiment, one or more components of the device management system each include a unique identifier. For example, at least one of the modular storage component, the modular sub-components of the storage component, and the managed devices associated with the device management system may be associated with a unique identifier. The unique identifier may be used by the control component to track and otherwise manage each of these components and devices. The unique identifier may be created by the device management system (such as by the control component), and/or a user. For example, as discussed above, an RF tag or bar code may be attached to a managed device that enables the control component to identify the managed device. Other managed devices, such as mobile phones, may also provide their own unique identifier that may then be used for purposes of tracking and managing the device.

At least one feature that may be provided by the control component includes a notification feature, where notifications may be sent to one or more users regarding the managed device. For example, a reminder may be sent to a user that a managed device is due to be stored in the storage component at a predetermined time, such as by 10 pm. A message, including an electronic message such as a text, may be sent to the managed device to alert a user of the impending deadline. The content, frequency, timing, specific managed device that is targeted, etc., associated with the notification may be configured by the administrative user through the use of the control component. Likewise, the administrative user may be notified, such as through a text or other communication, regarding activity with the managed device following the notification, such as by informing the administrative user that the managed device has been properly stored in the storage component. One or more of these features may be provided through software executed by with the device management system, as described herein.

According to a further aspect, a feature may be provided by the control component that allows or otherwise accommodates a response to a message that has been sent to a managed device, such as the aforementioned reminders, or warnings, etc. An administrative user may therefore have the capability to modify the rules and/or settings associated with usage of the targeted device. For example, a reminder may be sent to a user that the managed device is due to be turned in by a certain time. The user may respond that the managed device will not be returned by the designated time. This response may be forwarded or otherwise sent to the administrative user, who may in turn temporarily change a usage rule specifying the deadline to a later time.

Another feature that may be provided by the control component includes the ability for an administrative user to set up and modify usage and/or security rules associated with one or more components of the device management system, including the managed devices, compartments of the storage component, and users. The usage and/or security rules may be modified by the administrative user through the managed device itself, or through the use of software. In certain instances, the usage and/or security rules may be modified in real time, i.e., on-the-fly, by the administrative user. For example, a user may need to store the managed device in a compartment of the storage unit that is different than the compartment originally assigned to the managed device, or a user may need to access a certain website (e.g., a website served by the control component) using the managed device that is usually blocked to that user. The administrative user may then have the ability to temporarily or permanently change the usage and/or security rules associated with the managed device to allow the user to store the managed device in a different compartment, or to allow the user to access the website. For example, a child user may be starting a new activity one night a week that requires the managed device be returned to the unit later than the usual time. As a result, the parent administrative user may modify the usage and security rules of the device management system to accommodate the new later schedule for that night. These rules may also be changed in real-time or in near real-time by an administrative user. For instance, an administrative user may immediately modify the usage and security rules associated with a managed device so that it is required to be stored in the storage component for the day.

According to certain embodiments, the control component is configured to receive information regarding the managed devices associated with the device management system. For example, the control component may be configured to recognize when a specific managed device is located within the correctly assigned compartment within the storage component, and whether the managed device is charging, or needs to be charged. This information may be logged or otherwise saved by the control component, such as by recording time stamps as to when a managed device has been placed in and removed from the storage component. According to at least one embodiment, all activities associated with the device management system may be time stamped. This information may be later used, for example, by the device management system to compile data for the administrative user regarding use of the system. The control component may also log data collected from the managed devices, such as phone numbers of received and outgoing calls, texts, emails, pictures, voicemails, visited websites, etc. For example, when the managed device is placed into the unit for storage, the data may be automatically retrieved by the control component and logged. The logged data may then be made available to an administrative user for review. Further, the administrative user may also request data from the managed device on an ad-hoc basis, including instances where the managed device is not presently stored in the storage component. For example, an administrative user may be able to request a list of all outgoing phone calls made from a user's managed device during a time period when the device is not currently stored within the storage unit, e.g., during daytime school or business hours.

According to a further embodiment, the control component may also be configured to recognize incoming information to the managed device, such as phone calls, texts, emails, etc. when the managed device is stored within the storage component, and in certain instances, when the managed device is not stored within the storage component. Further, the control component can be configured to send a response to the sender, such as an icon or text that communicates certain information to the sender. This information may be chosen or otherwise selected by the administrative user. For example, if the device, such as a mobile phone, is stored in its respective compartment of the storage component by 9 pm and an incoming text message comes in at 10 pm, a text message may be sent to the sender of the text message. The administrative user may configure the responsive text message to convey certain information, such as that the user is currently unavailable. In the alternative, an icon may be sent to the user, signifying that the user is not available. According to another aspect, screen shots and/or other location information, such as GPS coordinates from a user's device may be captured by the control component and forwarded or otherwise made available to the administrative user. In certain instances, the control component may be configured to request this type of location information randomly. One or more of these features may be provided through an agent application, such as software that has been loaded onto the managed device and is configured to communicate or otherwise interact with other components of the device management system, such as the storage component. As will be appreciated, other methods besides software may be used for enabling one or more of these features as future technologies develop.

The control component may also be configured to audit the information received from the managed devices associated with the device management system. For example, new emails, texts, applications, pictures, voicemails, visited websites, etc., and other changes such as new contacts, phone numbers, passwords, etc., may be selectively audited by the control component. This information may also be logged and made available to an administrative user for review. For example, information regarding newly added applications to a mobile device, such as the address of the website linked to a newly added application, may be automatically sent to the control component and logged. According to a second example, either a portion of or the entire content of a communication, such as texts, emails, messages, images, etc., may be automatically sent to the control component and logged. According to a further aspect, a randomized sample of the log may be forwarded or otherwise made available to the administrative user. For instance, a random sampling of a user's text messages may be sent to an administrative user for review. According to another aspect, a sample of the log may be compiled based on one or more keywords, phrases, or any other analytic approach selected by the administrative user and/or the control component.

According to some embodiments, data collected from the managed devices by the control component may be used by applications and/or products that expand upon the normal type of usage associated with the managed device. For example, API's, third party devices, and applications may use the data for purposes of behavior modification, as discussed further below, and for statistical analysis, or for any other purpose where the information may be useful.

In accordance with another aspect, the control component may be configured to disable a managed device. For instance, a portable electronic device may be shut down or the screen may turn blank or black, thereby effectively disallowing immediate future use of the device by the user. Additionally, where the portable electronic device includes a mobile telephone, the control component may be configured to disable all functionality of the managed device except for the mobile telephone. Disabling of the managed device by the control component may be performed automatically by the control component, for instance, if the device management system detects that the managed device has not been returned by a designated time. In the alternative, the administrative user may request the control component to disable a managed device, for instance, when a user violates a usage agreement, such as by removing the managed device before a designated time, or when the user attempt to use the managed device for unauthorized purposes.

According to a further aspect, the control component may be configured to modify the managed device to function in any one of a number of different environments, such as a residence, a place of employment, a business, a retailer, a school or other educational institution, a federal or state building, etc. For example, one or more features or functional aspects of the hardware, software, and/or other components of the managed device may be altered or otherwise changed depending on where the managed device is located. For instance, while at school, an audible ringer on a user's mobile phone may be disabled. According to another example, the hardware, software, and other components of a managed device may be configured to meet specific requirements of an environment. For instance, military-grade encryption for all incoming and outgoing communications may be used when the managed device is located in a military environment.

According to another aspect, the control component is configured to include an automatic debit feature by subtracting or adding funds from a user's bank account. For instance, if a user damages or loses a component of the device management system, such as by damaging or losing the managed device and/or an accessory such as an adapter cable, then funds for a replacement device or accessory may be taken from the user's bank account and deposited into another bank account, such as an administrative user's bank account.

According to at least one embodiment, one or more components of the device management system are configured to interface or may otherwise be integrated as part of a security system. For example, the device management system may be part of a home's security system. According to one example, the storage component, including one or more compartments of the storage component, may be "wired" or otherwise linked to a home or business's security system. Thus, the device management system may be monitored through software accessible to the user through a device, such as a mobile phone or other managed device. In addition to being notified when a security breach of the device management system has occurred, the user may also be able to monitor the current status of the device management system, such as being able to determine which managed devices are currently stored in the unit, and/or request a log of data taken from one or more managed devices associated with the unit. Other features may include being able to unlock or lock the device management system using the interface associated with the home or business's security system, thus allowing to user to the option of locking or unlocking one or more secure areas from one central location. Besides a home or business security system, the device management system may be integrated as part of the architecture of an automation system or the Internet of Things (IOT), which may include security.

In accordance with certain aspects, one or more components of the device management system may be modified to utilize future technologies as they develop, for example, by taking advantage of new broadcast technologies for identification and messaging, new security technologies for password protection, and other related locking mechanisms, etc.

Component Overview

Figure 6A:
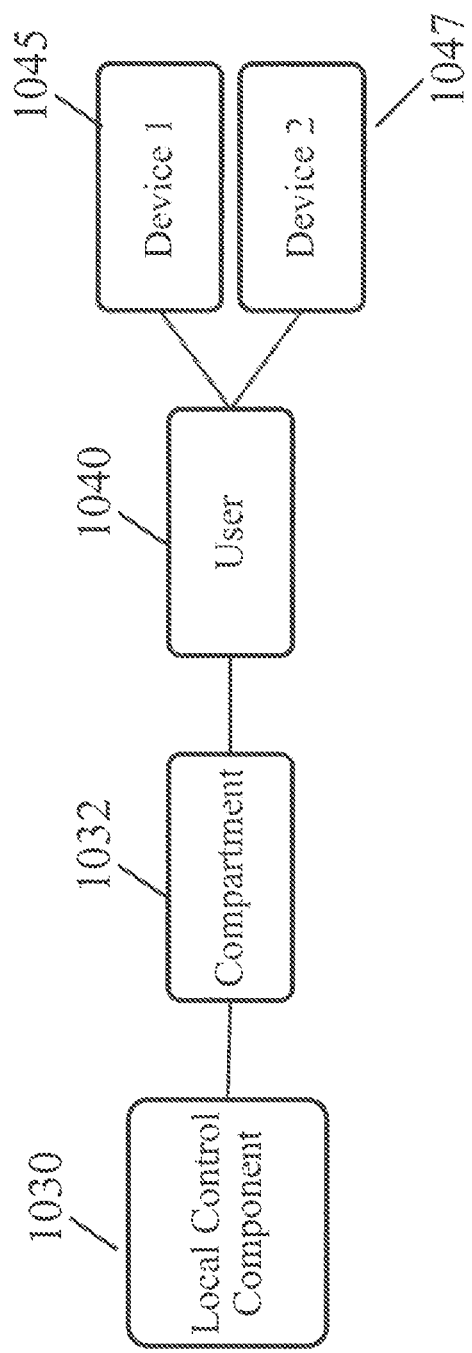
FIG. 6A is a context diagram of a local control component of a device management system in accordance with one or more aspects of the disclosure.

A representation of the relationship between one or more components of the device management system is shown in FIG. 6A. For example, a local control component 1030, such as may be implemented using a computer system, can be used to control access by a user 1040 to a storage compartment 1032, where one or more managed devices 1045, 1047 associated with the user 1040 may be secured. Access may be dictated by a usage plan and usage rules that are associated with the user.

Another representation of the relationship between one or more components of the device management system is shown in FIG. 6B. For example, a remote control component 1050, as discussed further below, may be located remotely from the local control component 1030. The remote control component may be implemented as a secure website. The remote control component may be accessed via a GUI 1042 and/or hardware associated with the device management system. For instance, the GUI may be implemented as an application that allows access to the remote control component, and, in certain instances, the GUI may transmit all commands to the remote control component, and not to or through the local control component. Hardware associated with the device management system may include one or more computer systems associated with the device management system, such as a computer system located locally in a user's home or office, as well as managed devices associated with the device management system.

Figure 7:
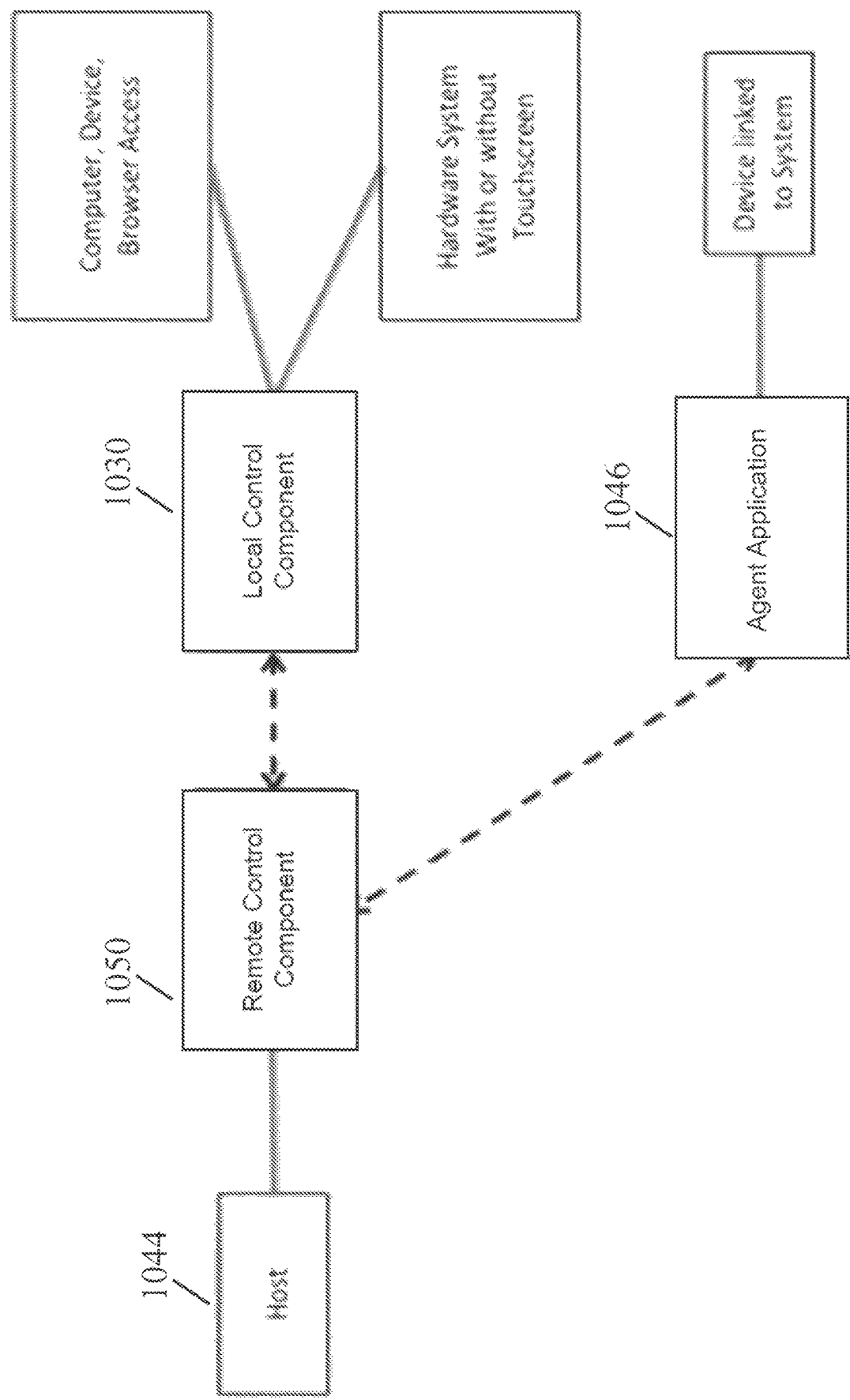
FIG. 7 is a block diagram of a device management system in accordance with one or more aspects of the disclosure.

A representation of different components of the device management system in accordance with various aspects of the disclosure is shown in FIG. 7. As explained further below, one or more of the components may include a host 1044, a remote control component 1050, a local control component 1030, and an agent application 1046.

Host

According to various embodiments, and as shown in FIG. 7, the device management system may also include a host component 1044. In accordance with some aspects, the host may comprise a local or remote computer system that functions to serve as a conduit between users and one or more other components of the device management system. According to other aspects, the host may include software that serves as the interface between the user and other components of the device management system. For example, the interface may include a user interface to the remote control component, and may exist as part of a larger set of components, for example, as a web-based portal embedded in a larger client portal.

Remote Control Component

According to certain aspects, a remote control component 1050 of the device management system may be located on a remote computer system or device, such as a host or host device, serving a website. The remote control component may include software and/or hardware components, such as the administrative application, which is discussed further below. According to various embodiments, all features of the device management system are computed and managed through the remote control component. In certain instances, the remote control component may be located on a remote website that is securely protected. Access may only be gained through password protection, such as by logging in through a GUI application, website, etc. using a secure protocol, such as SSL, HTTPS, etc. The remote control component may be used to access usage plans or schedules, usage rules, and other commands or functional aspects that are required for running the system. This information may be uploaded to hardware associated with the device management system. In certain instances, the data may be uploaded so that the system can continue functioning in the event a network connection is lost. The remote control component may request and/or otherwise receive information on a regular basis, such as once a week, and/or whenever changes are made, such as changes to a usage plan or schedule. Further, all commands issued from an interface, such as a GUI, may go through the remote control component, and not directly through a local control component of the device management system. For example, a user may log in to software associated with the device management system from hardware that is not associated with the device management system, such as an external computer (e.g., office), portable device, or any other device that allows access to the Internet using the GUI. Exceptions to this functionality may include access to usage plans and usage rules, which may go through the local control component instead of the remote control component for a certain period of time so that basic functions can continue, such as instances where the network goes down and interconnectivity is therefore compromised. Further, an administrative user may access features of the device management system, such as opening a compartment, or changing a schedule through the local control component. The remote control component may also allow for usage data or other information to be downloaded from the system based on requests from an administrative user, which may be automatically or manually packaged into a usage report and sent to an administrative user. According to certain aspects, the remote control component may also optionally allow for access to the device-based software. Further, the remote control component may initiate execution of the agent application and as indicated in FIG. 7.

Figure 12:
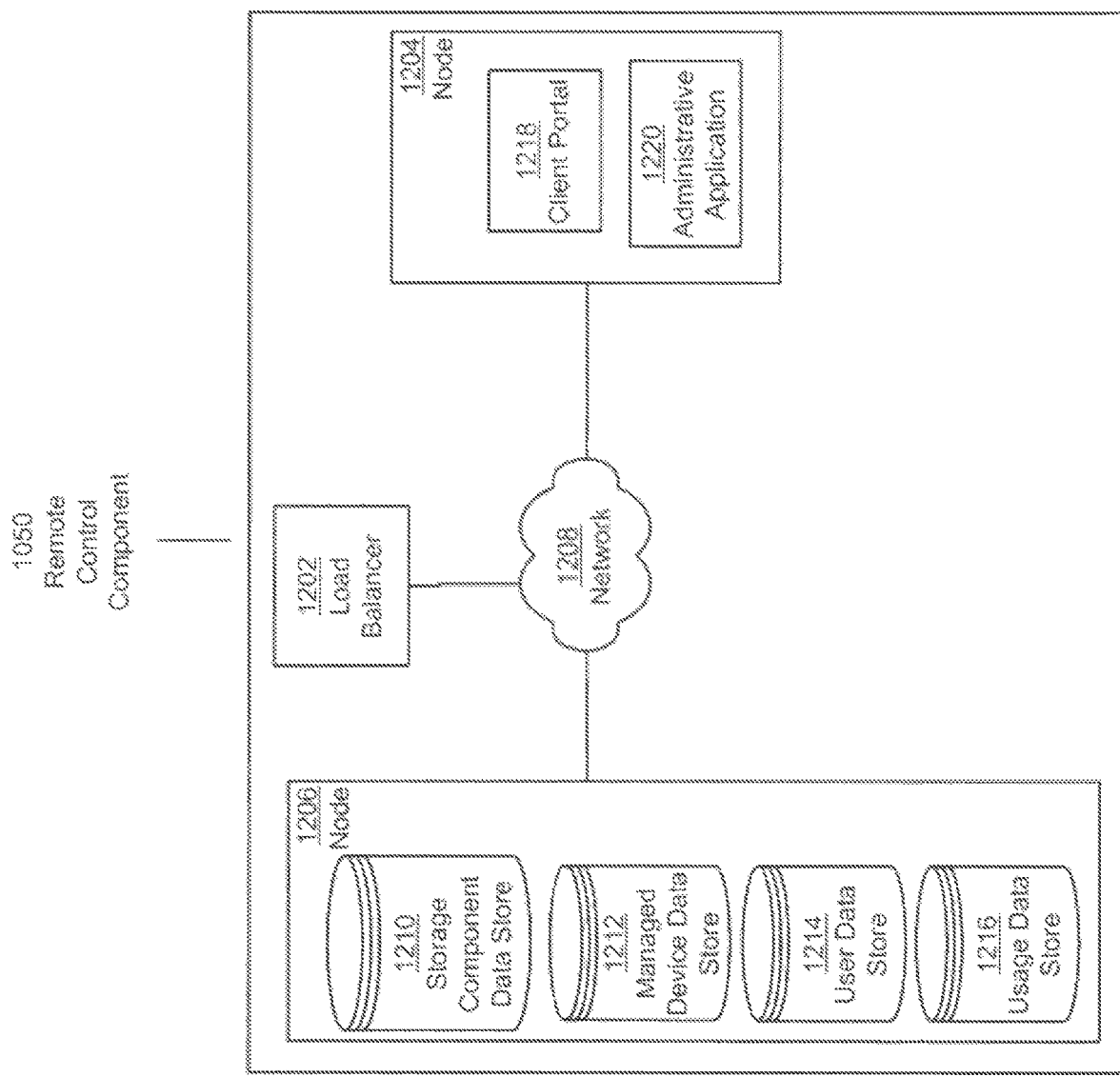
FIG. 12 is a block diagram of a remote control component.

The remote control component 1050 may be arranged according to a variety of architectures. FIG. 12 illustrates one such architecture in which the physical and logical components of the remote control component 1050 are configured as a distributed system. The architecture illustrated in FIG. 12 is provided for example purposes only and embodiments disclosed herein are not limited to the architecture shown in FIG. 12.

As shown in FIG. 12, the remote control component 1050 includes four primary physical elements: a load balancer 1202, nodes 1204, and 1206, and a network 1208. The node 1204 includes a client portal application 1218 and an administrative application 1220. The node 1206 includes a storage component data store 1210, a managed device data store 1212, a user data store 1214, and a usage data store. The load balancer 1202 and each of the nodes 1204 and 1206 may include one or more computer systems as described herein with reference to FIG. 11. Further, in some embodiments, each of the nodes 1204 and 1206 is a cluster implemented using Hadoop®, which is available from the Apache Software Foundation of Forest Hills, Md., or a similar software package.

In one embodiment illustrated by FIG. 12, the load balancer 1202 provides load balancing services to the other components of remote control component 1050. The nodes 1204 and 1206 provide computing resources to various processes executed by the remote control component 1050. For example, each of the nodes 1204 and 1206 provides data storage and retrieval functionality to locally and remotely executing processes. In addition, the node 1204 implements web server functionality in support of the client portal application 1218 and an administrative application 1220. This web server functionality may serve content using any suitable protocol including, among others, HTTP, SMTP, IMAP, and POP, and any suitable data formatting standard including, among others, HTML, DHTML, XML and MIME. The network 1208 may include any communication network through which member computer systems may exchange data.

In some embodiments, the node 1204 implements the client portal application and the administrative application as discussed below. In other embodiments, the node 1206 maintains a store of information descriptive of the storage component and its discrete sub-components in the storage component data store 1210. The node 1206 also maintains a store of information descriptive of the devices managed by the device management system in the managed device data store 1212. The node 1206 also maintains a store of information descriptive of the users of the device management system in the user data store 1214. The node 1206 also maintains a store of information descriptive of the managed device usage in the usage data store 1216.

Local Control Component

Referring back to FIG. 7, the device management system may also include a local control component 1030, which, in certain instances, allows a user to access software associated with the device management system, such as the administrative application, as discussed further below. According to various aspects, the local control component may include a GUI or other interface. The local control component may be implemented as at least one computer or touchscreen-based hardware system, and/or may be accessible via a web site, computer, or device. In some embodiments, the local control component includes a specialized computing device, such as the computing device described below with reference to FIG. 10. The GUI or interface may allow for interactions with the device management system and other users using the local control component.

Figure 10:
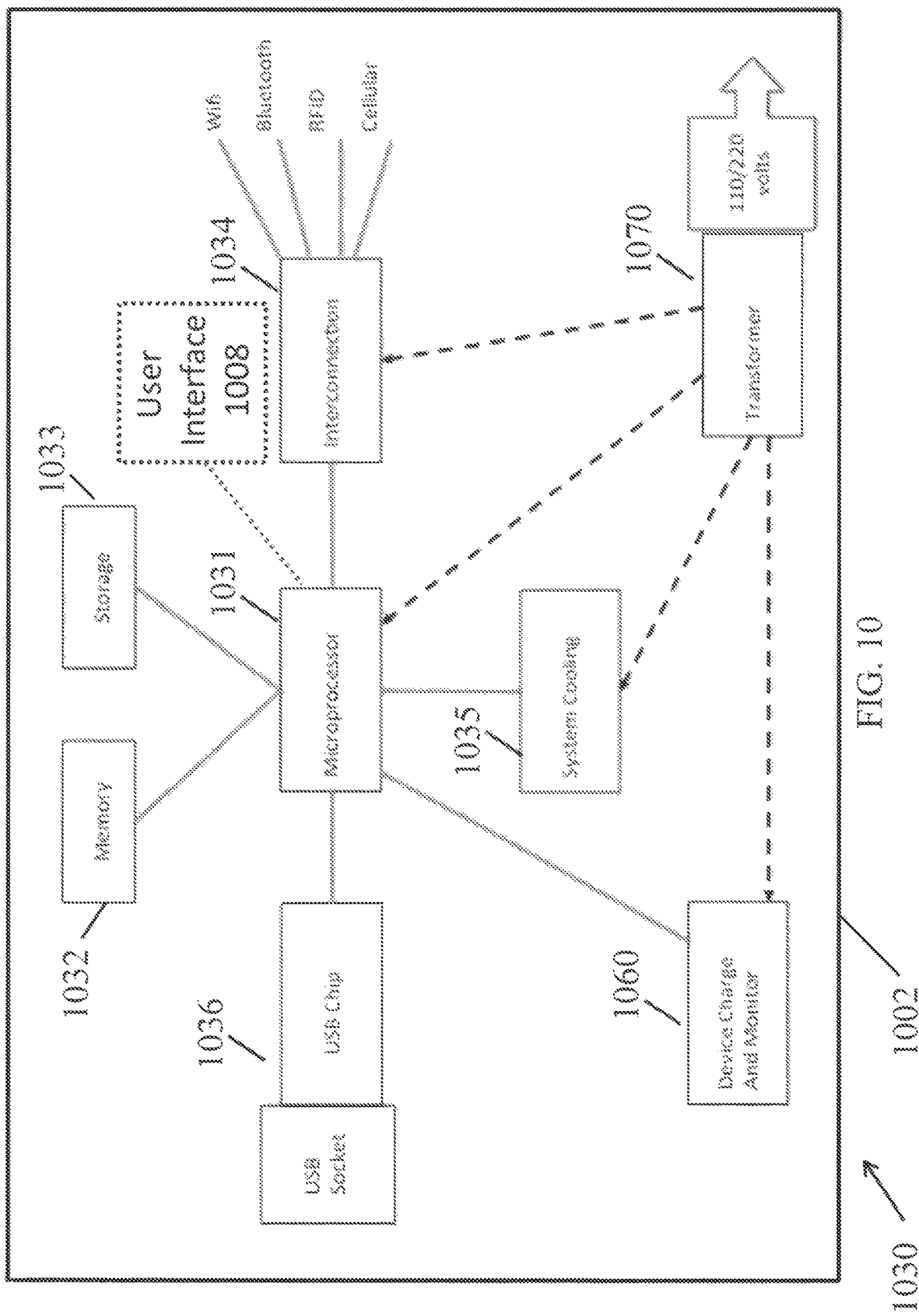
FIG. 10 is a block diagram of a local control component of a device management system in accordance with one or more aspects of the disclosure.

Referring to FIG. 10, a local control component of the device management system is shown. For example, the local control component may include a microprocessor 1031, memory 1032, data storage 1033, and system cooling 1035. An interconnection 1034 may be included. The interconnection may communicate by implementing a variety of standards such as WIFI, BLUETOOTH, RFID, and cellular technology. The local control component may also include an interface 1036, such as a USB port and/or USB chip that provides at least one of power and data exchange to one or more managed devices associated with the device management system and is coupled to or otherwise in communication with the microprocessor. In some embodiments, the interface 1036 includes two or more physical interface ports. In other embodiments, the interface 1036 is configured to support sundry physical interfaces and cabling types other than USB, such as Cat5 cable, Cat6 cable, fiber-optic cables, and the like.

A device charging element 1060 may also be included in the system, where managed devices may be secured and/or monitored. The device charging element is coupled to or otherwise in communication with the microprocessor 1031. For example, once a managed device is plugged in or otherwise secured into the charging device, usage data may be extracted and sent to the microprocessor and stored in the data storage element. The system may optionally include a transformer 1070, which may be coupled to one or more other elements, such as the device charging element. For instance, the device charging element may be configured to convert the 110/220 volt alternating current into either voltage or wattage necessary for the local control component using the transformer element, as discussed in the example below. The local control component may also include a housing 1002, which functions to enclose and/or store one or more components of the local control component. For example, in certain instances, the housing may be a storage component, or one or more elements of the storage component, as discussed above. An optional user interface 1008 may also be included as part of the device management system that is coupled to the microprocessor. For instance, the storage component may include a screen or display that functions to allow a user to access software associated with the system and/or allow access to a locking mechanism associated with a storage compartment. In other embodiments, the optional user interface 1008 may include one or more LED's coupled to a switch under the control of the microprocessor.

In some embodiments, the data storage of the local control component stores a local control application, such as the local control application described below. In this embodiment, the local control component may execute the local control application to perform the actions described below.

Software Applications

According to at least one embodiment, the device management system includes software configured to provide one or more features to the device management system. In general, the software application associated with the device management system serves to further the purpose of securing and managing the use of the devices. The software associated with the device management system includes functionality to configure, program, and monitor one or more aspects of the managed devices associated with the device management system. For example, when the software is first purchased, an administrative user may be able to perform one or more of the following tasks: sign onto a secure web portal, create and describe users for the device management system, define managed devices associated with the device management system, assign compartments of the storage component to managed devices, create usage rules for the managed devices, etc. One or more of these settings may then be communicated to the local control component, such as through the use of the Internet.

In some embodiments, the software includes features that collect descriptive information about the users, managed devices, the storage component, and other characteristics of the device management system. For example, user data such as names, including user names, user ages, pictures, MAC and IP addresses, etc. can be used by the software for purposes of identification.

As explained further below, software associated with the device management system may include three components: an administrative application, a client portal application, and an agent application. According to one or more aspects, the administrative application allows for access and control of the device management system. The administrative application may be executed by a remote control component, as discussed further below. A user may access the administrative application through a local control component, using a user's managed device, such as a desktop, laptop, or other portable device or other type of computer, an Internet-based interface, such as a browser-based web portal, and/or a user interface associated with device management system hardware. According to one or more aspects, the agent application may be an optional application installed on a managed device and may function in the background for the purposes of collecting usage data, controlling access to the managed device's features, disseminating data/information to the administrative application, and enhancing the link to the device management system.

Although particular components (e.g., the remote control component and the local control component) execute particular applications (e.g., the administrative application and the local control application) in particular embodiments, the embodiments disclosed herein are not limited to any particular configuration of components. For instance, in some embodiments, the local control component may execute any or all of the software applications described herein. Moreover, any of these software applications may be implemented as special purpose hardware (e.g., an ASIC) within particular embodiments.

Administrative Application

Figure 8:
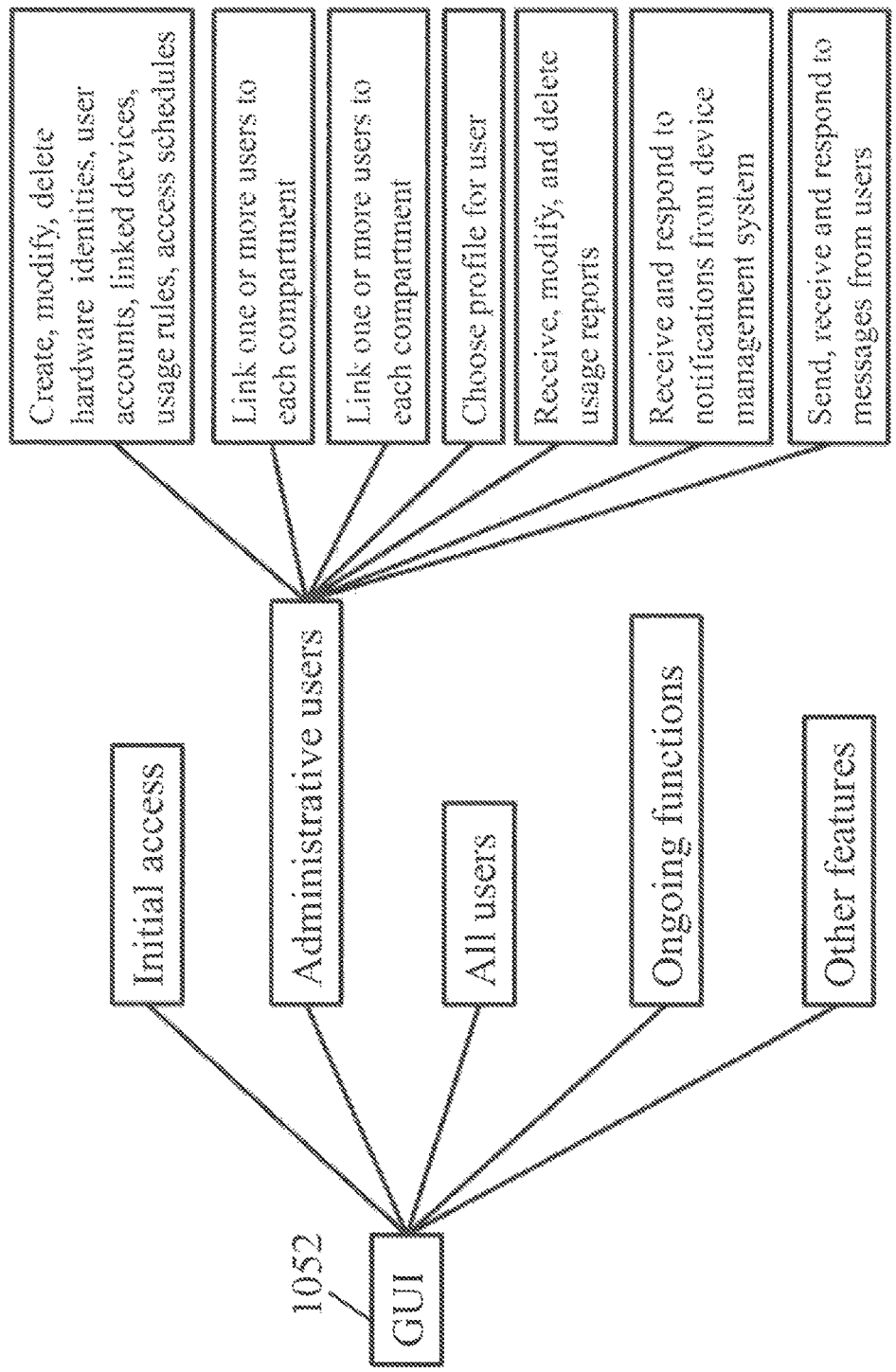
FIG. 8 is a block diagram showing some uses and features of an administrative application and GUI in accordance with one or more aspects of the disclosure.

According to various embodiments, the administrative application is used to access one or more of the hardware components of the device management system. A representation of the general uses and features of the administrative application is shown in FIG. 8. For example, access to the administrative application may be provided through a local control component, which implements a GUI 1052. In certain instances the GUI may be designed to optimize the device being used to access the administrative application.

For instance, a GUI for a laptop computer may not include touchscreen features, and a GUI for smaller screens on phones or on device management system hardware may be simplified.

According to certain embodiments, the administrative application provides initial access to the device management system. For instance, during initial access, an administrative user may be set up, including a name, password, etc. Further, the hardware associated with the device management system may be identified. This may be done through WIFI, Bluetooth, RFID, or other networking technology. The administrative user may also name the hardware, as discussed below. The device management system may link one or more hardware units together, if they are available.

In accordance with various embodiments, the administrative application allows for several functions associated with the administrative user. For example, the administrative user may create, modify, and delete hardware identities associated with the device management system such as the hardware name, MAC, and other identifying information. The administrative user may also create, modify, and delete user account, such as a user's name, username, password, and other identifying information associated with a user. The administrative user may also create, modify, and delete linked and managed devices to the device management system, including the device type, MAC, device name, and may delete a managed device that is linked to a particular user. The administrative user may also link one or more users to each compartment of the storage component discussed above. For example, the administrative user may identify the compartment when it is added to the device management system, link one or more users to one or more compartments and/or allow for the compartment to be accessed only by a the associated linked user(s) and the administrative user.

According to certain embodiments, the administrative user may choose a profile for each device user that provides initial usage rules and usage plans that the administrative user can modify. According to various aspects, the user profile may be set up and designed to focus on particular needs. For example, a developmental-type profile may be configured to set up an age-appropriate schedule and/or usage rules for a particular user. When inappropriate material or actions are detected, the administrative user may be notified with a developmentally appropriate suggestion. For instance, if a 14-year old user continues to use their phone past 10 pm, the administrative user will be sent a message suggesting that this is an issue that may be discussed with the child along with website links that are related to problems with late-night use of devices for adolescents. According to another example, a behavior modification-type profile, as discussed further below, may be configured to set up changes in certain managed device features over a period of time, either automatically, manually, or a combination of the two, followed by a plan approved by an administrative user. For instance, the behavior modification profile may include settings that reduce or increase access to certain managed device features over time, such as by allowing less access to games and more access to educational applications. The access behavior (included in the usage data) may also be collected and sent to the remote control component of the device management system for further processing. Changes in the behavior of the user's use of the managed device may also be monitored over time. Further, "rewards" may be offered for instances where the user follows the usage rules or plan, such as by allowing the user to spend more time on the managed device, and "punishments" may also be imposed when the usage rules are not followed, such as by allowing the user to spend less time on the managed device. In addition, usage reports may be prepared by the remote control component of the device management system and made available to the administrative user. According to another example, a strict-usage type of profile may be configured to restrict all but the most important functions of the managed device, such as the telephone (incoming and outgoing calls only) function and messaging (email, text, etc.), to a restricted list of contacts, such as only to the administrative user. Another type of profile may include a monitoring-only type of profile, where there are few, if any, restrictions placed on the functionality of the managed device, but usage data may be gathered and usage reports prepared for the administrative user. A temporary restriction type of profile may include restricted functions of a managed phone for predetermined periods of time. For instance, usage of certain functions of the managed device (i.e., texting, email, web access, and/or phonecalls) may be restricted during certain times of the day or for other blocks of time, such as during school hours or meetings. The managed device may also be required to be disposed in the storage component or other predetermined physical space (such as during evening hours) or use of the managed device may be otherwise restricted during a certain period of time. A religious type of profile may also be created that restricts certain functions or usage of the managed device during religious holidays or other religious-based periods of time. For example, the usage plan may automatically restrict access to one or more functions of the managed device (phone, text, email, web access, etc.) based on a religious observance or function, such as the Jewish Sabbath, Muslim Ramadan, or a religious service.

According to at least one embodiment, the administrative user may also create, modify, and/or delete managed device usage plans or schedules. For instance, the administrative user may set up the schedule for when a managed device is to be plugged in or otherwise secured in the device management system hardware, such as the storage component or any other predetermined physical space. The usage plan or schedule may be the same for all of a user's managed devices, or separate schedules may be set up for each managed device associated with a user.

In accordance with another embodiment, the administrative user may create, modify, and/or delete the usage rules associated with a managed device. For example, access to certain types of functions or features of the managed device may be restricted for a user, such as by blocking access to the Internet or disabling the texting capability on the managed device. Attempts by the user to violate the usage rules are messaged to the administrative user, and based on the configuration, consequences may be include may include shutting down or otherwise disabling one or more non-essential functions of the managed device.

Other functions associated with the administrative user include modifying usage plans or schedules and usage rules "on-the-fly," as discussed above, either temporarily or permanently, receiving, modifying, and/or deleting usage reports or logs, and accessing data associated with the device management system. The administrative user may also receive and respond to notifications or messages from the device management system, as well as receive and respond to messages from device users.

According to various embodiments, the administrative application allows for several functions related to all users of the device management system. For instance, users may modify some aspects of a user profile or account information, such as the user name and/or password, as well as some managed device information, such as the managed device name. Users may also view the usage plan or schedule and usage rules. Users may also receive certain usage reports from the device management system. For instance, if a message is sent by the system and received by a user that a managed device is late for being secured into the device management system hardware, such as the storage component, the user can acknowledge this and request extra time. The request will then be forwarded to the administrative user, who can then respond or allow the system to use a preconfigured response, such as by allowing 10 extra minutes for all first requests. The administrative application may also allow users to send, receive, and respond to messages from other users. For example, a user can request an "on-the-fly" schedule change in the usage plan from the administrative user.

In accordance with at least one embodiment, the administrative application also allows for one or more ongoing functions of the device management system. For example, compliance with the usage plan or schedule may be monitored, so that when a managed device is due to be plugged in or otherwise secured in the device management system, the system will send a message to the user's managed device and the administrative user if the managed device is late. Further, if a managed device is removed or unauthorized access to the managed device is attempted during a time when the managed device is secured, the administrative user may be sent a message, and optionally, one or more functions of the managed device may be blocked. The administrative application also controls access to the compartment(s) of the storage component or other predetermined physical space via the local control component. For instance, the compartments may be locked and may only be accessible by the user during the scheduled times. Further, the compartments may always be accessible by the administrative user. The administrative application may also control the locking mechanism, via the local control component, so that the compartment is unlocked or locked, such as by using a touchpad where users may enter a password or code to gain access to the compartment.

According to various embodiments, the administrative application may function to log managed device usage, such as by recording or receiving information as to when a managed device is plugged in or otherwise secured by the device management system hardware (e.g., the local control component and the storage component). This may also optionally be performed using a device-based application, as discussed further below. The administrative application may then send the usage data at regular intervals to the remote control component for further processing. In certain instances, the administrative application may also function to poll or request information from one or more linked managed devices to determine usage data, such as the managed device's location, content of usage (i.e., texts, voicemails, photos, emails, etc.), power level, etc., and the data may be logged, as discussed above. This may be done wirelessly, through WIFI, RTIF, Bluetooth, etc.

According to some embodiments, other features provided by the administrative application may include the ability to securely "hook" or otherwise link into other applications, for example, calendars, messaging software, etc. to allow for integration with existing applications. Further, the administrative application may allow for other applications to securely hook or link into the administrative application.

In accordance with at least one embodiment, at least some components of the software associated with the device management system, such as the administrative application, may include a "Wizard" feature that interacts with the user and assists in the set-up and maintenance of one or more managed devices that are stored in the device management system. For example, the computer system of the device management system may have interactive help files called "Wizards" that may be used to guide the user or administrator through one or more steps of a particular task, such as starting up one or more components of the device management system, configuring the user management functions, or starting up and using a software application associated with the device management system. According to one example, a "Rules Wizard" prompts administrative users for information about users, such as the age, usage parameters associated with the managed device for a user, including the length of time allowed on the managed device and the type of use allowed, (e.g., phone calls are allowed with the managed device, but texting and taking photographs with the managed device are not allowed). According to a further example, the usage information may be used by the Wizard in combination with recommendations or guidelines provided by an external source, such as a professional organization, including organizations such as the American Academy of Pediatrics, etc., to provide recommendations regarding usage to the administrative user. This information may then be used to set up usage rules for the user by the administrative user. According to another example, a "Plan Wizard" is designed to assist users in developing usage plans based on the managed devices, individual users of the managed devices, and recommended device usage provided from an external source, such as a professional organization. Options, boilerplates, templates, etc., may be presented by the Plan Wizard to the administrative user. Some or all of this information may be used for the purposes of creating one or more elements of a usage plan or contract for device users to agree to follow. For example, an administrative user may use the Plan Wizard to create a managed device usage contract for another user, such as a child.

In some embodiments, the "Wizard" feature may be included in software that is local to the device management system, such as stored on a local computer system, and in other embodiments the "Wizard" may be included in an application that is external to the device management system, such as a client portal. In addition, the options, boilerplates, templates, plans etc., utilized by the Wizard may also be available via a software library that can be accessed by administrative users.

Local Control Application

According to certain embodiments, one or more features may be unique to the local control application. These features may be embedded via updateable firmware and/or on-board storage. For example, management of charging and data synchronization may be performed by the local control application. For instance, data related to the level of battery power may be logged and compared to a previous time, such as when a managed device was previously plugged into or otherwise secured with the device management system. This capability may be able to determine if the managed device was charged outside the system. Data synchronization may also be managed using available services, such as iCloud, Amazon, or other proprietary systems.

In accordance with certain aspects, the local control application may download usage data, such as calls, messages, application usage, etc., from managed devices when they are plugged into the system. Further, the usage data may be collected, including times when the managed device was plugged in and/or removed, attempts to access the managed device when it is scheduled to be secured, charging information, synchronizing information, and then packaged into a usage report. The local control application may also access usage plans and usage rules for a period of time, such as a 1-week period of time, by accessing the remote control component and exchanging the data so that the system can continue to function in case network connectivity is compromised.

The local control application may utilize a touchscreen to allow for an administrative user to directly access compartments of the storage component, change usage plans and usage rules, and/or respond to notifications. For example, changes to the usage plans or rules may be recorded and integrated into the user plans and user rules stored in the remote control component, and a report may be sent to an administrative user when this is done. Further, all users may use the touchscreen to access, lock, and unlock compartments, such as at their scheduled access times, using a username and password combination.

According to various aspects, during periods of time where connection to the Internet is lost, the local control application may continue to run as normal, for example, by following a schedule that was most recently received from a host or the remote control component. The local control application may collect and hold usage data in memory on the local control component until the Internet connection is reestablished. An administrative user may also be notified, if possible, when the Internet connection is lost, such as by local WIFI, a cellular network, etc. An alert message may also be displayed on the touchscreen indicating that connection to the Internet is lost.

According to other aspects, during periods of time where power is lost, the local control application may notify the administrative user, and in certain instances, secure compartments may be unlocked. Further, when power is restored, the administrative user may be notified, and the compartments may be re-locked and/or an alert message may be displayed on a touchscreen of hardware associated with the device management system.

According to certain aspects, the local control application is configured to collect usage data, such as emails, texts, phone calls, images, etc., from each managed device and then process the data in a variety of ways. For example, the local control application may create usage reports, and then send some or all of the data to the administrator at predetermined or random intervals, and/or send data to another component of the device management system, such as the remote control component for purposes of further processing and analysis, and/or otherwise integrate the data into other systems or applications associated with the device management system, such as a client portal, discussed further below.

Agent Application

Figure 9:
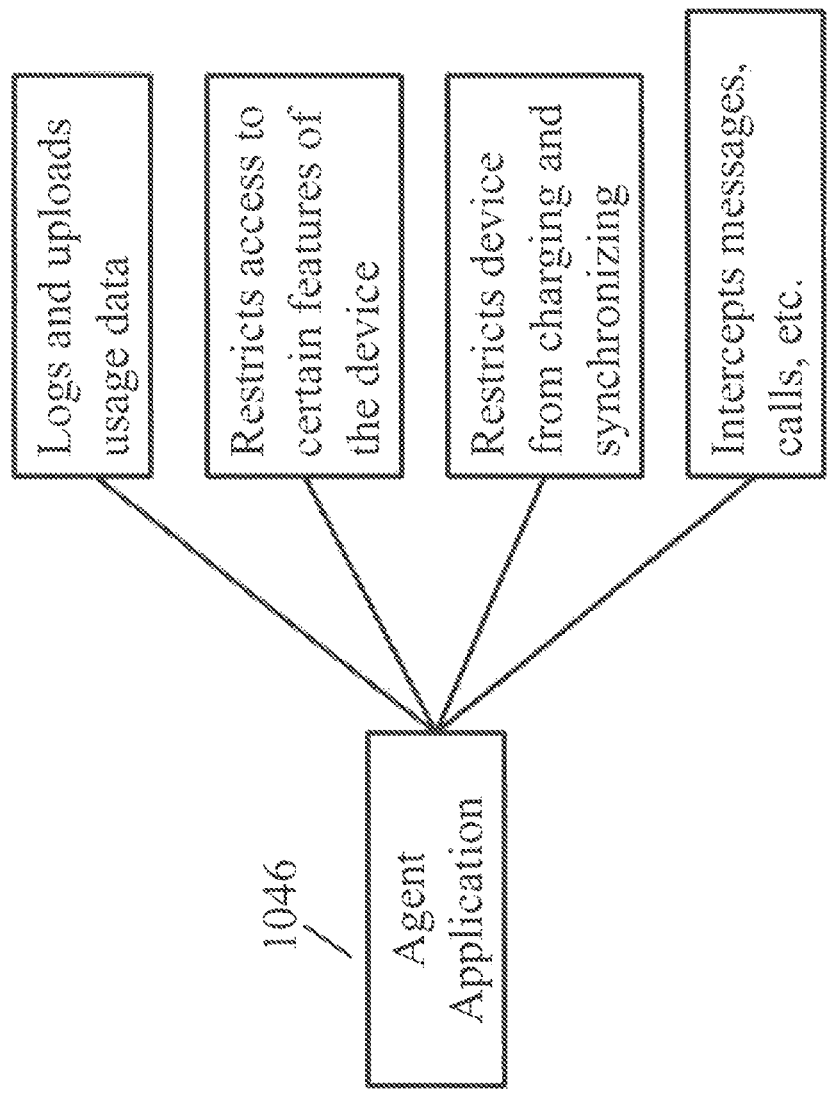
FIG. 9 is a block diagram showing some uses and features of an agent application in accordance with one or more aspects of the disclosure.

According to various aspects, the device management system may optionally include an agent application 1046, such as a device-based application that can be installed on a user's managed device. A representation of the general uses and features of the device-based application is shown in FIG. 9. For example, the device-based application may function to log and upload usage data to a remote control component of the device management system. This may be done at regular intervals, such as when the managed device is secured into the hardware of the device management system. In certain instances, the device-based application may restrict access to certain features of the managed device according to usage rules or a usage plan. For example, a usage plan designed to modify behavior may restrict access to texting or emails. The device application may also log attempts to access the restricted features, and if configured, may also send a notification to the administrative user of such attempts. The device-based application may also be configured to restrict managed devices from charging and/or synchronizing except through the components of the device management system, and/or log or otherwise record non-system attempts to do these activities. The device-based software may also intercept messages, phone calls, etc. and log these communications, notify the administrative user, and/or block the communications.

According to at least one aspect of the device management system, an application on the managed device can be controlled. For instance, the agent application may be configured to force the managed device to charge only when it is secured in the designated compartment of the storage component. Further, the agent application may be configured to interfere with charging functions on the managed device under circumstances where the agent application registers or otherwise detects that the managed device is not securely stored in the storage component. For example, the agent application may be configured to recognize when a managed device is currently being charged, such as through the battery status, and then poll or otherwise obtain information from the storage component to determine if the device is currently positioned inside (or transmit a request to the local control application to make this determination). If the managed device is not positioned in the storage component, the administrative user may be notified, and a setting on the managed device may be changed to disallow or otherwise terminate the charging activity from the external source. In alternative embodiments, the local control component may be configured to recognize an increase in battery power for a device, which indicates that the managed device has been powered by an external source other than the device management system. Other methods of monitoring may include using wireless or Bluetooth technologies.

According to various embodiments, one or more of the functions of the device management system can be controlled by software alone, and may not require the use of the storage component or other types of specialized hardware. For example, the agent application may constrain functionality of an application on a portable electronic device based on a conflict with a schedule, violation of a contract, such as a usage agreement, etc., or any other managed device functions, as discussed herein, such as by disabling the managed device. Further, the agent application may constrain the ability of the managed device to charge only using the device management system, as described above. For example, charging may only be allowed if no other applications are in use, if the managed device is put into "sleep" mode, etc. According to another example, the agent application may be configured to work independently, or may interact with a remote application, as may be executed, for example, by the remote control component.

Client Portal (Web-Based Application)

According to at least one embodiment, the control component includes a client portal, which may also be referred to as a Web-Based Application. For example, access to the device management system may be via an online web-site which is in communication with the device management system and the managed devices associated with the device management system. According to another example, the web-site may be used to register one or more managed devices, such as by registering the device's product key code, and to perform the initial set-up of the managed device and make it functional for use by the designated user. Data from the managed device, such as pictures, texts, voicemail, emails, documents, etc., may also be obtained from the managed device and used by the client portal. The data may be used to make modifications to the managed device, such as changing usage rules associated with the managed device, changes to the information associated with a user, changing the user and/or managed device configuration of a compartment of the storage component, and changes to any on-board software or firmware associated with the managed device. According to one aspect, the data sent to and from the client portal may be encrypted.

The client portal may include software configured to provide one or more features to the device management system. For example, usage of the device management system may be integrated into an online website that is dedicated to managing the devices associated with the device management system. For example, the client portal may interact with the administrative user and assist in the initial set-up and maintenance of one or more managed devices that are stored in the device management system. The client portal may also include information, including educational information, related to the management and control of the device. For example, information for parents regarding mobile phone usage guidelines for children may be made available. One or more of the materials and services made available by the client portal may be free, purchased, and/or subscription-based. Usage plans, including existing and/or recommended usage plans for different types of users may also be available to view using the client portal.

One example of a feature that may be included on the client portal includes a feature to add, remove, or change different options associated with the device management system, such as the ability to change or add icons, sounds, special functions, etc. Another feature may include access to materials that may be integrated into the use of the device management system, such as options for monitoring, reporting, etc., and plans designed to bring about specific outcomes, such as reducing the usage of the device. In addition, usage plan templates may be communicated to the managed device. The client portal may also backup data from the device management system, including data obtained from the managed devices, such as pictures, visited websites, video, audio (including voicemails), calendars, contacts, emails, texts, documents, etc. The backup data may be accessed by one or more users, such as administrative users, and reviewed. According to another aspect, the calendars of one or more users may be made available to other users, such as the administrative user, for viewing and planning events. For instance, a user may add an event to their electronic calendar that is stored on their respective managed device. The administrative user may then be notified of the added event. Further, the event may then be added or otherwise synchronized with the calendar of the administrative user.

An additional feature that may be available through the client portal is a service that compares the applications stored on a managed device to a database (or other form of storage) that contains a list of undesirable, addictive, or otherwise harmful applications. The client portal may then alert or otherwise inform an administrative user about the presence of the harmful application on the managed device. Similarly, the client portal may offer a service that identifies words, such as curse words, phrases, actions, etc., in texts, emails, or other forms of communication on a managed device that are associated with undesirable activity. The service may further be configured to search and identify this type of undesirable content from the managed device data randomly, or at predetermined intervals, such as every $10^{th}$ email. This information may then be forwarded to the administrative user. Another service or feature that may be included with the client portal is the ability to interact with other individuals, families, peer groups, or other support forums whose focus is to better manage and control usage of the managed device. For example, parents of children with similar ages may be able to interact with each other and share advice or experiences related to the use of the mobile phone (or other managed device) by their respective children. The interactive forum may therefore function to assist administrative users in setting up rules regarding usage of the managed device.

According to one or more aspects, the device management system, including the applications executed by the remote and local control components, may be configured to interface with other software applications, whether they are located on local or remote computers, portable devices, or other hardware, such as a storage component. The interface may be used, for example, to modify one or more functions of the device management system, and/or to modify the functionality of software, hardware, etc., associated with the device management system. The ability to interface may provide one or more functional aspects to the device management system, including the ability to interface with calendar applications, such as Google Calendars, to assist in scheduling and managing usage time of the managed device. For example, a user who is usually required to store the managed device by 7 pm according to an existing usage plan may be allowed extra time on one or more evenings if an approved activity interferes with returning the managed device by 7 pm, such as an activity that is scheduled to last until 8 pm. Further, the device storage schedule may be added to the user's calendar. The device management system may also interface with existing or future systems that utilize communications or networking protocols for device communication, such as Apple Inc.'s HomeKit, Thread Group protocols, etc.

According to various embodiments, the device management system may be configured to communicate with associated managed devices via local, remote or other protocols. For example, the agent application on a managed device may function to control communication with the device management system. Managed devices may be configured to communicate via an in-house or otherwise local network, through the Internet, or, if the managed device is out of range of the local network, communication may be performed through the cellular network, etc. In instances where communication is not available, the agent application on the managed device may store information until communication with the device management system is restored. Communication with the device management system may be established, for example, through a dedicated server, whether it be locally on-board the system or located remotely through the Internet, and/or through secure services such as VPN, etc. Communications may include data related to the location of the managed device, general or specific usage information, data sent from or received to the managed device, such as texts, emails, outgoing and ingoing phone numbers, etc. This data may be used, for example, by the device management system to create reports, logs, etc. that are made available to the administrative user.

According to at least one embodiment, the device management system may be notified of parameters associated with available subscription plans for each managed device, such as the number of cellular minutes, the amount of data usage, or the number of texts associated with the managed device's telecommunication subscription plan. The device management system may be further configured to constrain or otherwise restrict access to and/or usage of the managed device based on these plans. For example, the device management system can message a managed device when the user approaches the maximum number of texts the plan allows. Alternatively, the device management system may lock out or otherwise disable text functioning through the use of the agent application, as described above. The system may then make recommendations for modifying cellular or data plans based on usage patterns, input provided by the administrative user, etc. For example, the device management system may recommend increasing the volume or amount of allowed texting for a user who consistently texts more than the managed device's particular plan allows. According to a further aspect, the device management system may have access to the managed device's telecommunication subscription plan and may formulate recommendations for the administrative user regarding changes that can be made to the plan based on information from external sources, current usage data, long or short-term goals for a specific user, etc. In certain instances, the device management system may be configured to make changes to the subscription plan, without the assistance of the administrative user.

Depending on the needs and requirements of the users, the device management system may include one or more additional features. For instance, the device management system may include a local control component, and not include a storage component. According to another example, the device management system may be configured to provide extra security, such as using stronger construction materials, including more secure locks, including more sophisticated password protection, and/or utilizing encrypted software communication, such as using military-grade encryption. In addition, hardware and software associated with the device management system can be modified to best serve the environment for which they are being used. For example, a device management system used in the military may be built to comply with regulations for security, hardware, and software. Further, specialized device management systems may be devised, with variations in hardware and software, to meet the needs of a particular situation. For example, individuals attending a meeting may be required to secure their mobile phones in a device management system. This type of device management system may therefore be configured to create temporary passwords for each individual user as they enter the meeting, and the managed device may be secured in an available, rather than a permanently assigned, compartment of the storage component. Thus, the compartment is available to a particular user for a one-time use, using a temporarily assigned password, such as a thumb print. At the end of the meeting, the user may retrieve the managed device from the compartment, and the device management system may then reset the user information for that compartment for the next user who has temporary storage requirements. As mentioned above, according to some examples the device management system may be portable, and may be configured to include features that aid in mobility, such as obtaining power through the use of batteries, and may include single storage components, etc. Software may also vary based on the type of environment the device management system is being used. For example, corporate-based software for a device management system used in a business may include different feature settings than home-based software used in a residential setting.

According to some embodiments, related information, recommendations, etc. may also be used by the device management system for modifying user behavior as described herein. For example, increasing the limit on the volume or amount of texts allowed in a managed device's plan (whether it is a usage plan set up by the device management system or a plan associated with a telecommunications provider) may function to reinforce reducing overall usage of the managed device. According to another example, data related to a user's pattern of using the managed device more than the particular plan allows may be used to design a behavior modification strategy for the user.

In accordance with one or more embodiments, the device management system may be used to modify aspects of a user's functional usage of the managed device. For example, by controlling access and functionality related to usage of a managed device, the user may modify their behavior by reducing the amount of time spent using the managed device, and/or reducing or eliminating certain types of activities, such as visiting certain types of web sites, etc. Goals related to a user's functional use of the managed device may be determined by an administrative user, and/or by one or more processes that are integrated or otherwise associated with a software interface.

According to a further aspect, the device management system may be configured to allow an administrative user to monitor an online "profile" for one or more users. For instance, a user's Facebook, Twitter, or other social media account may be monitored by an administrative user. According to a specific example, a teenage user's Facebook page may be monitored by a parent through a software interface with the storage device.

Computer System

As discussed above, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers, and switches. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

According to some embodiments, software associated with the computer system may include one or more of a variety of features. According to at least one embodiment, the software may include a feature that allows users to be configured with different privilege levels. For example, one level of user may only be allowed to access or remove the portable device during certain times of the day. Further, the software may include a feature that assigns devices or storage components to specific users. Another feature may include the ability to configure times for when specific devices, such as children's cell phones, are scheduled to be in storage. The software may also include the ability to send out notices to one or more devices or administrators when the devices are not stored at their respective scheduled times. Another feature may include the ability to configure and monitor back-ups and data transfers, such as photos or usage data, to and from one or more of the portable devices. Further, a feature may be configured to display logs for when each device is transferred in and out of the device management system. The software may also include a feature that allows an administrator to access device usage data. An additional attribute of the software may include managing data that is stored locally or off-site, such as data stored on a "cloud." Other non-limiting features of the software may include managing the temperature or the quality of an electrical signal associated with the system, such as an electrical signal associated with a cooling/heating system or an uninterrupted power supply (UPS).

Figure 11:
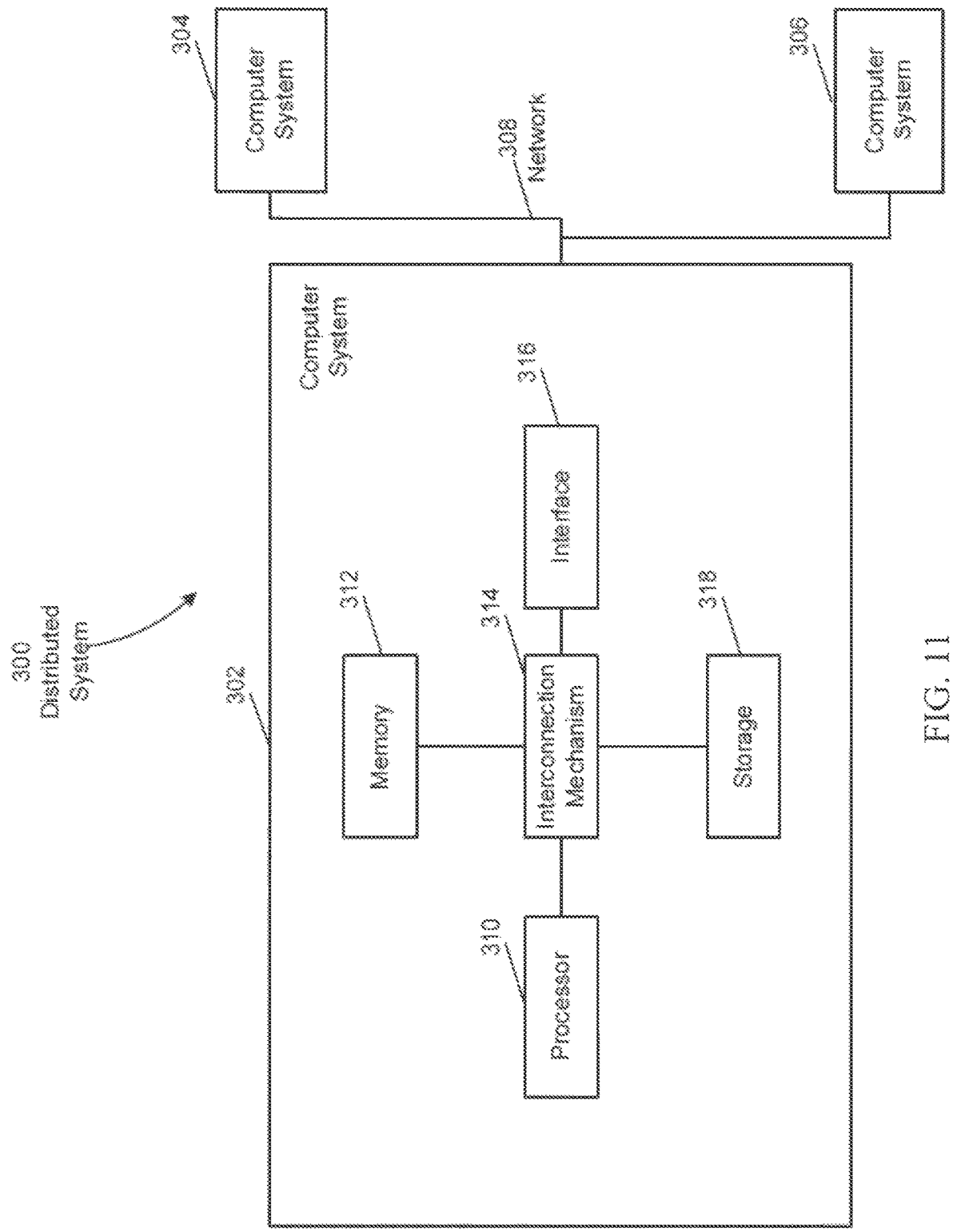
FIG. 11 is a block diagram of an example computer system in accordance with one or more aspects of the disclosure.

Referring to FIG. 11, there is illustrated a block diagram of a distributed computer system 300, in which various aspects and functions are practiced. As shown, the distributed computer system 300 includes one or more computer systems that exchange information. More specifically, the distributed computer system 300 includes computer systems 302, 304, and 306. As shown, the computer systems 302, 304, and 306 are interconnected by, and may exchange data through, a communication network 308. The network 308 may include any communication network through which computer systems may exchange data. To exchange data using the network 308, the computer systems 302, 304, and 306 and the network 308 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 302, 304, and 306 may transmit data via the network 308 using a variety of security measures including, for example, SSL or VPN technologies. While the distributed computer system 300 illustrates three networked computer systems, the distributed computer system 300 is not so limited and may include any number of computer systems and computing devices, networked using any medium and communication protocol.

As illustrated in FIG. 11, the computer system 302 includes a processor 310, a memory 312, an interconnection element 314, an interface 316 and data storage element(s) 318. To implement at least some of the aspects, functions, and processes disclosed herein, the processor 310 performs a series of instructions that result in manipulated data. The processor 310 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 310 is connected to other system components, including one or more memory devices 312, by the interconnection element 314.

The memory 312 stores programs (e.g., sequences of instructions coded to be executable by the processor 310) and data during operation of the computer system 302. Thus, the memory 312 may be a relatively high performance, volatile, random access memory such as a dynamic random access memory ("DRAM") or static memory ("SRAM"). However, the memory 312 may include any device for storing data, such as a disk drive or other nonvolatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the interconnection element 314. The interconnection element 314 may include any communication coupling between system components such as one or more physical busses in conformance with specialized or standard computing bus technologies such as IDE, SCSI, PCI and InfiniBand. The interconnection element 314 enables communications, including instructions and data, to be exchanged between system components of the computer system 302. The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touchscreens, printing devices, display screens, speakers, network interface cards, etc. Interface devices allow the computer system 302 to exchange information and to communicate with external entities, such as users and other systems.

The data storage element(s) 318 includes a computer readable and writeable nonvolatile, or non-transitory, data storage medium in which instructions may be stored that define a program (e.g., the software applications discussed above) or other object that is executed by the processor 310 or may be used to store backup data from specific portable devices stored in the system. For example, data storage element 318 may include one data storage element dedicated to programs executed by the processor 310 and another element dedicated to data backup from stored portable devices. The data storage element 318 also may include information that is recorded, on or in, the medium, and that is processed by the processor 310 during execution of the program. More specifically, the information may be stored in one or more data structures specifically configured for each type of data to conserve storage space or increase data exchange performance. The instructions may be persistently stored as encoded signals, and the instructions may cause the processor 310 to perform any of the functions described herein. The medium may, for example, be optical disk, magnetic disk or flash memory, among others. In operation, the processor 310 or some other controller causes data to be read from the nonvolatile recording medium into another memory, such as the memory 312, that allows for faster access to the information by the processor 310 than does the storage medium included in the data storage element 318. The memory may be located in the data storage element 318 or in the memory 312, however, the processor 310 manipulates the data within the memory, and then copies the data to the storage medium associated with the data storage element 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 11. Various aspects and functions may be practiced on one or more computers having a different architectures or components than that shown in FIG. 11. For instance, the computer system 302 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Intel Core processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system. The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as . Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein. In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

In some embodiments, one or more components of the computer system may be changed as technology improves or the needs of the user change. For example, more memory 312 or a larger storage unit 318 may be added.

Behavior Modification Example

A non-limiting example of the use of the device management system for modifying a user's behavior may be provided by an administrative user who is a parent and a user who is a child. For example, a parent may desire to decrease a child's usage of a smart phone. As an administrative user, the parent may input information into a software interface included in the device management system, including information such as the age, grade in school, and typical usage patterns of the child. The parent may also optionally input personal preferences, such as specific parameters to limit access to certain types of web sites, reduce the amount of use of the smart phone on school nights, etc. The software interface may include a feature or program that is configured to use this information to generate recommendations for modifying the child's use of the smart phone. The feature or program may draw on information that may include, but is not limited to, established professional recommendations for children's use of digital devices, for example recommendations based on position papers published by professional organizations, findings of research studies, etc., and/or baseline usage data gathered over a period of time, including the amount of time the child spends on each targeted managed device, how long the managed devices are stored in the device management system, what applications on the managed devices are utilized, what web sites are visited using the managed device, etc.

Based the information received and/or stored by the software, an process may be executed to provide suggestions to the parent about ultimate usage goals and a plan to reach those goals, such as by increasing the amount of time that the managed devices are secured in the device management system over a window of time, cutting off access to particular sites or types of web sites, removing particular applications from the managed devices, etc. In addition, the plan may be accepted, modified, or replaced by the parent. The software interface may also be configured to program the device management system to follow the plan, provide recommendations to the parent to help achieve the desired goals, and communicate with associated software on the managed device, for example, by removing applications, limiting access to certain applications and web sites, etc.

According to a further aspect, one or more goals related to modifying the user's behavior may be integrated into contracts or usage agreements generated by the software. For example, a contract between the parent and child may include changing one or more aspects of the child's usage of the managed device in exchange for the parent allowing access to the managed device.

Suggestions for behavior change may be based on well-accepted, evidence-based strategies drawn from behavioral science and psychology. These approaches may be programmed into the software processes and provide the basis for recommended plans to modify device use. Further, these approaches may function to maintain at least some level of compliance to the behavior modification plan.

According to a first example, at least one strategy may be targeted toward reinforcement, where one or more incentives are provided when the user's behavior is consistent with the plan. For instance, if a child secures the managed device during the scheduled times for a period of time, the device management system may allow extra access time to the managed device or other managed devices (such as a gaming system) during the weekends. This type of strategy may also allow children to receive "virtual" reinforcers that may be accumulated and traded in at a later date in exchange for certain privileges. For instance, every day a child complies with the usage plan, the unit may send a virtual "badge" that indicates compliance with the plan. After a certain number of compliance indicators are accumulated, a reward may be given to the child. For instance, five badges may be traded in for 20 minutes of extra device time on a weekend.

According to a second example, punishment may be used as a strategy for behavior modification. Punishment may provide at least one disincentive when the user's behavior is inconsistent with the plan. For example, if a child refuses to secure the managed device during scheduled times the system may cause the managed device to be inoperable for a period of time, thereby decreasing the amount of "desired" usage time with the managed device by the user.

According to a third example, a titration strategy may be used to modify a user's behavior. Titrating access to one or more website, device applications, etc., includes decreasing over a certain period of time the amount of time the user is able to access the managed device, certain applications, web sites, etc. For example, the device management system may be configured to require that the managed device be stored in the system for 10 additional minutes every two days until the secured time goal is reached. The rate of titration may be constant, intermittent, random, modified by the parent, etc.

According to a fourth example, cutting off access to one or more of the managed devices, certain websites, device applications, etc. may be used as a strategy to modify the user's behavior. Immediately stopping access by deleting all games from a managed device, blocking access to certain websites, or keeping a managed device locked in the device management system, are all non-limiting examples of blocking access for purposes of modifying behavior. Cut-off from access may be permanent, or over a period of time, such as a set period of time determined by a parent.

According to a fifth example, feedback may be used as a strategy to modify behavior. Feedback includes information regarding the progress toward one or more goals set for the targeted user. For example, the device management system may send a message, such as a text, to the child regarding his or her compliance with the plan, such as "Great Following the Plan!" In the alternative, virtual "badges" or other indicators may be sent to the child when they reach milestones, for example, by reducing their usage of the managed device by 30 minutes for 5 days straight. Feedback may also be used when multiple children are engaged in behavior modification plans. For example, messages may show that one child has shown more compliance with the plan, with the underlying goal being that creating a game-like environment may create or otherwise further compliance with one or more of the children. Feedback may be varied or targeted to be appropriate for the particular child (since children of different ages may respond to different types of feedback), based on developmentally-appropriate recommendations programmed into the software, provided by parental input, etc.

The examples listed above that are directed to strategy are non-limiting examples. Other specific approaches may be based on well-accepted, developmentally appropriate strategies, and may be programmed into the software interface, and/or modified or substituted by parents.

According to a further aspect, the software interface may report ongoing progress to the parent. Measurement of progress may be based in part on: the amount of time managed devices are securely stored, usage data drawn from ongoing monitoring as previously described, attempts by the child to circumvent constraints on access (such as being late to secure the managed device in the device management system and/or attempts to access restricted materials, etc.), and input from the parent. The software interface may provide recommendations for modifying the plan based on progress. Modification of behavioral change strategies may be automatic, modified or replaced by the parent, etc.

Although the above example used a parent as an example of an administrative user, other non-limiting examples of administrative users include managers, supervisors, sponsors, higher-level employees, commanders, etc. Likewise, users are not limited to children, and other non-limiting examples of users include lower-level employees, interns, entry-level position holders, etc.

The above examples are illustrative in nature and not complete. For example, the device management system may also serve as a tool to appropriately increase time on a managed device, instead of decrease time. For instance, a parent may desire to allow a growing child more time on the managed device and may therefore use one or more functional aspects of the device management system to titrate an increase in allowable time the child spends using the managed device based on specified milestones, for example returning the managed device to the device management system on time for five days, refraining from using undesirable applications, web sites, etc.

Device Management System Example

One non-limiting example of a device management system is discussed below. The device management system may include at least one interface, a computer system, a power and charging system, a synchronization system, and a security measure that controls access to managed devices that are associated with the device management system.

An interface may include a device or electronic connection that allows for at least one or power and data exchange between the managed device and the local control component. For example, the interface may include a USB-type of connection and/or a USB control chip that functions to identify the managed device and act as a conduit for charging and data exchange. In certain instances, connecting the managed device to the interface automatically initiates functions of the device management system, such as identifying and matching the device/user with the identifier stored in the system's database, charging the managed device, synchronizing data, logging usage data such as connect/disconnect times, downloading usage data, such as records of phone calls, messages, application usage, etc., and storing this data. Further, a comparison may be performed between the managed device connection time and the usage rules or usage plan associated with the managed device, with the results sent as a notification to an administrative user.

A computer system, as discussed above, associated with the device management system may include at least one of a processor, memory, interconnection element, interface, and a data storage element. For example, the processor may function to coordinate and run the system, process data brought in from each connected managed device, manage security, including access, rules, such as usage rules and/or usage plans, for each connected managed device, run software instructions, manage communication between users and managed devices using, for example, WIFI, Bluetooth, RFID, cellular, etc., and/or process user commands, requests, etc. via a software interface. The memory may function to dynamically store data, commands, etc. as needed for the processor and other components of the system. The interconnection element may coordinate communications, transmit necessary data, etc. between one or more components of the system and users. For instance, the interconnection element may communicate via an electrical connection, networking protocol, RFID, etc. An interface may function to provide interconnection or transmissions between users and components of the system via software using, for example, a touchscreen, remote software interface, etc. A data storage element may provide long-term storage of usage data collected from connected managed devices, users, usage plans, usage rules, etc. used by the system to manage and secure the devices.

A power and charging system associated with the device management system may be managed by software via the computer system. For example, the power and charging system may plug into a 110/220 volt wall current and may also convert the 110/220 volt alternating current into either voltage and wattage necessary for the local control component, or convert it into 5 volts and (2.4 Watts) for energizing an interface, as discussed above. Further, the power and charging system may function to determine the charging needs of any managed device connected to the interface, and may also charge the managed device and/or monitor the managed device's charge level. In addition, the charge levels may be logged when the managed device is connected and disconnected. In some instances, the power and charging system may automatically disengage when the managed device is fully charged.

A synchronization system may also be associated with the device management system and may include hardware and/or software. For example, when a device is connected and/or secured by the system, the synchronization system may allow for data to be synchronized based on selection criteria programmed onto the managed devices or by an administrative user, such as all data, music only, etc., so that certain types of data or other information (such as usage rules or usage plans) is downloaded or uploaded. Usage data may be synched to a service chosen by an administrative user, such as iCloud, Amazon, Box, or other proprietary service, an in-home storage service, etc.

The security measure or aspect of the device management system may include hardware and/or software that functions to control access to managed devices that are connected to the system. For instance, the control component of the system may include the usage rules determined by an administrative user, which may be transmitted or otherwise communicated to the system via a software interface. Further, device usage rules may also be stored on a remote memory via a host, where the host uploads the usage rules to the device management system at regular time intervals and/or when changes are made. In addition, access to the managed device may be based on a predetermined usage plan, or may be determined on-the-fly, if usage rules are violated or complied with. Control information may be stored and accessed for later reporting, and based on the system settings may be sent to the administrative user as a usage report.

The device management system may also include at least one storage component, as discussed above. One or more of the components of the system described above may be enclosed in one or more system compartments that are designed to securely connect together both mechanically and electrically. At least one storage compartment may be designed to connect to the system compartment using a secure mechanical and electrical connection. The secure electronic connection may be used within the storage compartment. The storage compartment may be configured to interface with the computer system associated with the device management system which functions to manage access and interface with the stored managed device. Further, the managed device may be stored within the storage compartment, for example, in a drawer that slides in and out of the storage compartment. Each storage compartment may be assigned to a specific user by an administrative user using a software interface, as discussed above. The storage compartment may also be electromechanically locked based on usage rules and/or usage plan. The compartments of the storage component may be designed to connect in a variety of ways, such as between the base and cap, on the side of the base or cap, to other storage compartments, etc. This allows for owners or administrative users to determine the physical appearance of the storage system.

A host, as described above, may also be included in the system, which may be in communication with at least one of the interface and the control component. The host may function to manage one or more aspects of the system, including certain functions of the interface and the security component. For example, the host may function to: manage one or more databases that include information associated with managed devices and users, identify managed devices connected to the system, charge connected managed devices, synchronize data on connected managed devices with a backup or synchronization service, implement usage rules and/or usage plans defined by an administrative user, communicate with administrative users and other users regarding managed device status, secure the device either mechanically or via software, log access, power, synchronization, and other device usage data, and manage access to the managed device and the managed device's features, such as messages, web browsing history, etc. Communication with users may be via a software interface, such as a web portal, software application, and/or device-based application (e.g., the agent application). Communication with the interface and the security component may be through the computer system as described above, such as through a home network, Internet, intranet, Bluetooth, WIFI, RFID, etc. The host may also be in communication with at least one managed device. For example, the host may communicate with a managed device associated with the device management system via the computer system described above and/or directly with the managed device, for example, if the computer system is unable to communicate with the managed device. Communication may be provided using any suitable known method, including a home network, Intranet, Internet, Bluetooth, RFID, etc.

The device management system may also include a user interface that is in communication with the host. For example, the user interface may be used to access one or more features of the system, which in certain instances may be configured to be independent of the hardware configuration. For example, a software-only system may include all the features of the system except those that require a hardware interface, such as the charging and storage features discussed above. The user interface may be a GUI software application that is stored, for example, on the host, a user's computer(s) or other digital devices, the computer system associated with the device management system, a remote system, such as a web software application, and/or any other computer system. The user interface may be accessed by all users, although certain features may remain available only to administrative users. For instance, features that may remain accessible only by administrative users may include, but are not limited to: user creation, modification and deletion, managed device identity creation, modification, and deletion, compartment assignment, usage plan and usage rule creation, modification, and deletion, ability to modify or otherwise change usage plans on-the-fly, and the ability to request and create and receive logs or other usage reports. Features that may be accessible to all users include, but are not limited to: reviewing usage plans, modification of user and managed device information (which may require permission of the administrative user), request on-the-fly changes to a usage plan or usage rule from the administrative user.

One or more components of the device management system may be configured to be modular. For example, separate systems can be added together, either in proximity or remotely, and may be configured to merge into a single "virtual" system. For example, a first system may be plugged into a wall in a closet and a second system may be located in an office but will virtually link into the first system to form one larger system. For systems that include a storage component, the compartments may be physically added to the storage component in order to expand storage, and the storage elements may be connected both mechanically and electrically, as discussed above. For example, compartments may be connected in an unlimited variety of configurations to produce different styles and accommodate different spaces. For instance, compartments may be connected in a top to bottom configuration, side-to-side configuration, etc. Compartments may also be created that are of various sizes, based on the needs of the users. For instance, compartments may be sized to fit only one smartphone, or may be sized to fit several managed devices, etc. The software component of the system may also be modular, where sets of features may be added to an existing core of features. For instance, software modules may include user profiles, each of which may include a set of usage rules and/or a usage plan that targets a different type of user profile, as discussed above, such as a behavior modification plan, religious accommodations, school-based usage rules and plans, etc.

All functions of the device management system may be controlled using a software application. For instance, the application may include an administrative application, as discussed above, which is made up of components that are installed in multiple locations. Certain elements of the administrative application may be included in the remote control component, which may be located with the remote host as described above. For instance, all commands and information may go through the remote host component, which may also function to coordinate communications between other components of the system, including users, hardware, and managed devices. Certain elements of the administrative application may also be included in or provided by the local control application, which may be executed by a local control component, at least one computer or touchscreen-based hardware system, or may be accessible via a website. A GUI may allow for interactions between the device management system and other users via the remote control component of the system.

A local control application, such as may be implemented in software executed by a computer system associated with the device management system may have several functional aspects, non-limiting examples of which include: identifying managed devices as they are plugged into or otherwise secured by the device management system, managing power and synching usage data from managed devices that are plugged in or otherwise secured by the system, maintaining usage rules and usage plans associated with the managed device, which in certain instances may be downloaded or accessed from the control component, controlling compartments of the storage component, managing a touchscreen user interface, logging usage data from the managed devices and uploading the data to the control component, and following instructions in case of the loss of power or network connection, as discussed above.

Device-based software (e.g., the agent application) may be optionally included in the device management system. For example, the device-base software may allow for direct monitoring and logging of usage data of a device, and when configured, may also limit access to features of the device based on the usage rules and plan. The device-based software may also be modified to allow for additional features as they are developed.

Device Management Process

Figure 13:
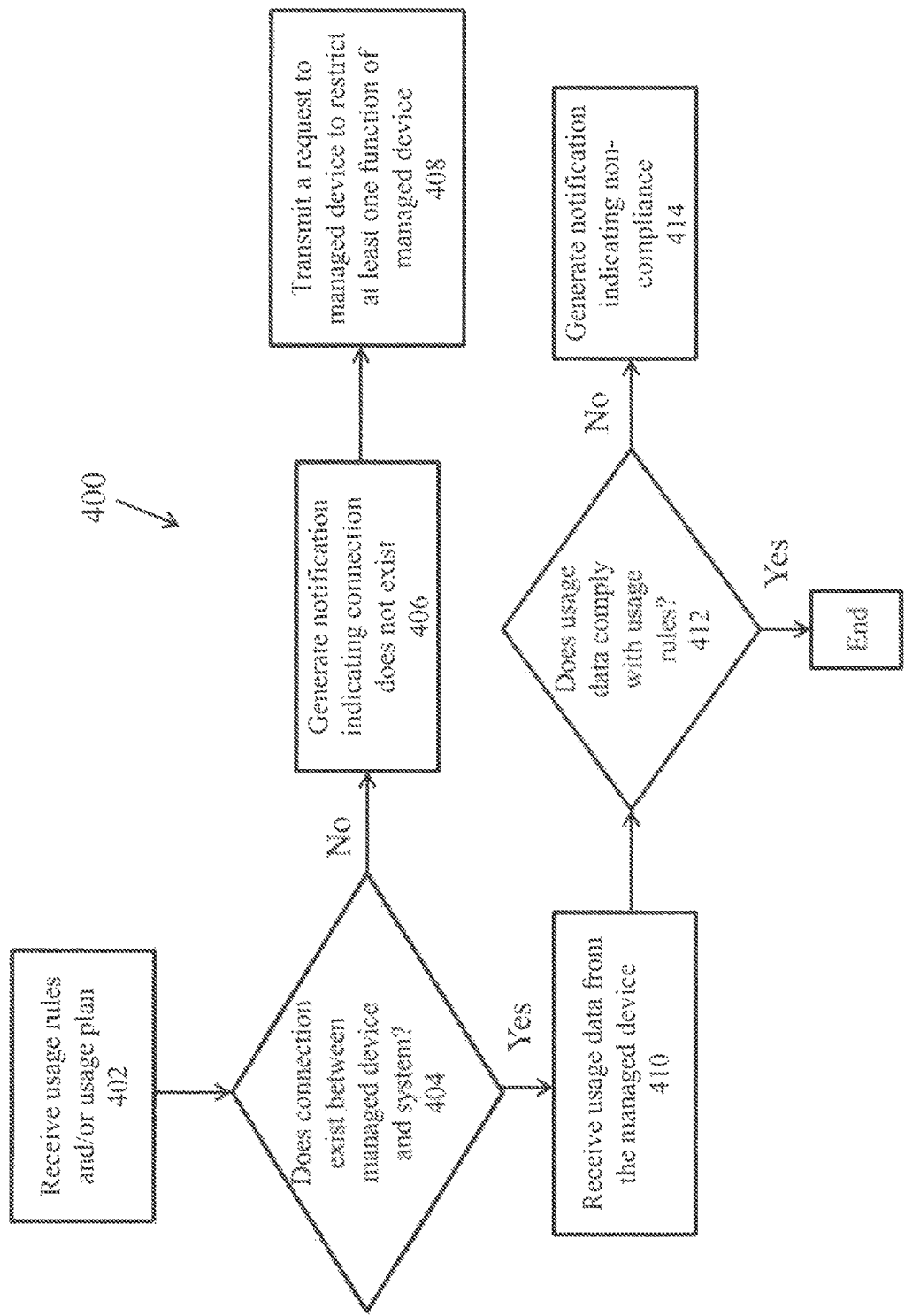
FIG. 13 is a flow chart illustrating a method for managing at least one device.

FIG. 13 is a flow chart illustrating a process 400 for managing at least one device. At block 402, the control component receives at least one of usage rules and a usage plan for a managed device associated with the device management system. For example, the usage rules and/or usage plan may be defined by an administrative user using software and stored on a computer system, such as the remote control component discussed above. At block 404, the control component determines whether a connection exists between a managed device and the device management system. For example, the control component may detect or otherwise be capable of receiving a signal through an interface that a managed device is connected to the system. In certain instances, this may be based on a usage plan, such that at a predetermined time the control component queries the existence of the connection. According to one example, the control component detects the existence of a managed device in a compartment of the storage component through the use of a USB interface. In response to a determination that the connection does not exist between the managed device and the system, the control component generates a notification, at block 406, that the connection does not exist. For example, a text message may be sent to both the administrative user and the user of the managed device that the managed device has not been secured according to the usage plan. At block 408, the control component then transmits a request to the managed device to restrict at least one function of the managed device. For example, if the managed device is a telephone that has not been placed or otherwise secured by the device management system, then one or more functional aspects of the managed device may be disabled, such as the use of texting, access to the Internet, etc. Further, other functions, such as voice calls, may still retain their functionality on the managed device.

In response to a determination that the connection does exist between the managed device and the system, the control component may then receive usage data, at block 410, from the managed device. At block 412, the control component determines whether the usage data complies with the usage rules. This may be done by comparing the usage data to the usage rules. If the control component determines that the usage data did not comply with the usage rules, then a notification is generated, at block 414 that indicates non-compliance. For example, the usage rules may be configured to allow only 60 minutes of Internet use on the managed device per day. If the usage data indicates that Internet usage exceeded 60 minutes, then a notification may be sent to the administrative user. If the control component determines that the usage data did comply with the usage rules, then the process ends, although in certain embodiments, a notification of compliance may also be generated. For instance, using the above example, if the user stays under the 60 minute limit, then a message may be sent to the administrative user. The usage rules may be defined to control the usage of one or more features of the managed device. For instance, besides the aforementioned time limit for a function of the managed device, such as Internet access, voice calls, texting, games, etc., the usage rules may also be defined to restrict specific aspects of a particular function of the managed device. For instance, certain contacts or websites may be designated as "off limits." Certain applications on the managed device may also be designated as restricted by the usage rules, such as games, music, photos, etc.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A device management system comprising:
    a storage component comprising a housing, the housing comprising
        a first memory,
        a first network interface,
        a second network interface, and
        one or more processors coupled to the first memory, the first network interface, and the second network interface, the one or more processors being configured to:
            determine whether a connection exists between a managed device and second network interface;
            generate, in response to a determination that the connection does not exist,
            a notification indicating the connection does not exist; and
            transmit the notification to at least one processor via the second network interface;
    a second memory storing at least one usage rule specifying an amount of time for a user to access the managed device;
    a third network interface; and
    at least one processor coupled to the second memory and the third network interface and configured to
        transmit, to the managed device via the third network interface, a reminder specifying that the managed device is due to be stored in the storage component at a predetermined time based on the amount of time;
        receive, from the managed device via the third network interface, a request for extra time in addition to the amount of time for the user to access the managed device;
        transmit, to the managed device via the third network interface, a response indicating whether the request is allowed;
        receive the notification;
        identify, based on the amount of time and the extra time, a new predetermined time; and
        transmit, to the managed device via the third network interface at the new predetermined time and, in response to the notification, a message indicating the managed device is late for being secured.

2. The device management system of claim 1, further comprising the managed device, wherein the managed device is configured to
    generate the request; and
    transmit the request to the at least one processor.

3. The device management system of claim 1, wherein the at least one processor is further configured to
    provide the request to an administrative application; and
    receive the response from the administrative application.

4. The device management system of claim 3, further comprising a user interface coupled to the at least one processor, wherein the at least one processor is further configured to provide a representation of the request to an administrative user via the user interface.

5. The device management system of claim 3, wherein to receive the response comprises to receive a response indicating that an extra 10 minutes is allowed.

6. The device management system of claim 1, wherein the response is a preconfigured response and the at least one processor is further configured to automatically generate the preconfigured response upon receipt of the request.

7. The device management system of claim 1, further comprising a user interface coupled to the at least one processor, wherein the at least one processor is further configured to provide, via the user interface at the new predetermined time and in response to the notification, another message indicating the managed device is late for being secured.

8. One or more non-transitory computer readable media storing computer executable instructions configured to implement a device management system, the computer executable instructions comprising instructions to:
    access, by at least one processor, memory storing at least one usage rule specifying an amount of time for a user to access a managed device;
    transmit, to the managed device by the at least one processor via a first network interface, a reminder specifying that the managed device is due to be stored in a storage component at a predetermined time based on the amount of time;
    receive, from the managed device by the at least one processor via the first network interface, a request for extra time in addition to the amount of time for the user to access the managed device;
    transmit, to the managed device by the at least one processor via the first network interface, a response indicating whether the request is allowed;
    determine, by one or more processors, whether a connection exists between the managed device and a second network interface within the storage component;
    generate, by the one or more processors in response to a determination that the connection does not exist, a notification indicating the connection does not exist;
    transmit, by the one or more processors, the notification to at least one processor via a third network interface;
    receive, by the at least one processor, the notification;

identify, by the at least one processor based on the amount of time and the extra time, a new predetermined time to secure the managed device; and transmit, to the managed device by the at least one processor via the third network interface at the new predetermined time and, in response to the notification, a message indicating the managed device is late for being secured.

9. The one or more non-transitory computer readable media of claim 8, wherein the computer executable instructions further comprise instructions to:

generate, by the managed device, the request; and transmit, by the managed device, the request to the at least one processor.

10. The one or more non-transitory computer readable media of claim 8, wherein the computer executable instructions further comprise instructions to:

provide, by the at least one processor, the request to an administrative application; and receive, by the at least one processor, the response from the administrative application.

11. The one or more non-transitory computer readable media of claim 10, wherein the computer executable instructions further comprise instructions to provide, by the at least one processor, a representation of the request to an administrative user via a user interface.

12. The one or more non-transitory computer readable media of claim 11, wherein the instructions to receive the response comprise instructions to receive a response indicating that an extra 10 minutes is allowed.

13. The one or more non-transitory computer readable media of claim 8, wherein the response is a preconfigured response and the computer executable instructions further comprise instructions to automatically generate, by the at least one processor, the preconfigured response upon receipt of the request.

14. The one or more non-transitory computer readable media of claim 8, wherein the computer executable instructions further comprise instructions to provide, by the at least one processor via a user interface at the new predetermined time and in response to the notification, another message indicating the managed device is late for being secured.

15. A method of managing user access to devices, the method comprising:

transmitting, to a managed device by at least one processor via a network interface, a reminder specifying that the managed device is due to be stored in a storage component at a predetermined time based on an amount of time for a user to access the managed device;

receiving, from a managed device by at least one processor via a first network interface, a request for extra time in addition to an amount of time for a user to access the managed device;

transmitting, to the managed device by at least one processor via the first network interface, a response indicating whether the request is allowed;

determining, by one or more processors, whether a connection exists between the managed device and a second network interface within the storage component;

generating, by the one or more processors in response to a determination that the connection does not exist, a notification indicating the connection does not exist;

transmitting, by the one or more processors, the notification to at least one processor via a third network interface;

receiving, by the at least one processor, the notification;

identifying, by the at least one processor based on the amount of time and the extra time, a new predetermined time to secure the managed device; and transmitting, to the managed device by the at least one processor via the third network interface at the new predetermined time and, in response to the notification, a message indicating the managed device is late for being secured.

16. The method of claim 15, further comprising:

generating, by the managed device, the request; and transmitting, by the managed device, the request to the at least one processor.

17. The method of claim 15, further comprising:

providing the request to an administrative application;

providing, by the administrative application via a user interface, a representation of the request to an administrative user; and receiving the response from the administrative application.

* * * * *